United States Patent
Fukui

(10) Patent No.: US 10,452,114 B2
(45) Date of Patent: Oct. 22, 2019

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Akitomo Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 15/715,334

(22) Filed: Sep. 26, 2017

(65) Prior Publication Data
US 2018/0101210 A1 Apr. 12, 2018

(30) Foreign Application Priority Data
Oct. 6, 2016 (JP) .................. 2016-198328

(51) Int. Cl.
| | |
|---|---|
| G06F 1/32 | (2019.01) |
| G06F 1/3203 | (2019.01) |
| H04N 1/00 | (2006.01) |
| G06F 3/12 | (2006.01) |
| G03G 15/00 | (2006.01) |
| G06F 1/3206 | (2019.01) |
| G06F 1/3215 | (2019.01) |
| G06F 1/3231 | (2019.01) |
| G06K 15/00 | (2006.01) |

(52) U.S. Cl.
CPC ....... *G06F 1/3203* (2013.01); *G03G 15/5004* (2013.01); *G03G 15/5016* (2013.01); *G06F 1/3206* (2013.01); *G06F 1/3215* (2013.01); *G06F 1/3231* (2013.01); *G06F 3/1221* (2013.01); *G06F 3/1229* (2013.01); *G06F 3/1236* (2013.01); *G06K 15/406* (2013.01); *G06K 15/4055* (2013.01); *H04N 1/00896* (2013.01); *G06F 3/1279* (2013.01); *H04N 2201/0094* (2013.01); *Y02D 10/173* (2018.01)

(58) Field of Classification Search
CPC .......................... G06F 1/3231; G06K 15/4055
See application file for complete search history.

(56) References Cited

U.S. PATENT DOCUMENTS

| | | | | |
|---|---|---|---|---|
| 2007/0288778 A1* | 12/2007 | Zhuang | ................ | G06F 1/3203 713/320 |
| 2014/0376020 A1* | 12/2014 | Imamura | ............ | H04N 1/00896 358/1.13 |

FOREIGN PATENT DOCUMENTS

JP 4843372 B2 11/2007

* cited by examiner

*Primary Examiner* — Albert Wang
(74) *Attorney, Agent, or Firm* — Venable LLP

(57) ABSTRACT

An image processing apparatus is provided with a main controller unit that comprehensively controls the image processing apparatus, and a microcomputer that controls a load. During a period in which the image processing apparatus transitions from a first power mode to a second power mode having lower power consumption than the first power mode, the main controller unit prohibits acceptance of an interrupt signal, and cancels the prohibition of interrupts when the transition to the second power mode completes. Meanwhile, when an interrupt signal is generated from the load during the transition period, the microcomputer repeatedly notifies the interrupt signal as a pulse signal to the main controller unit, and notifies by changing the pulse signal to a level signal when prohibition of interrupts is cancelled.

12 Claims, 16 Drawing Sheets

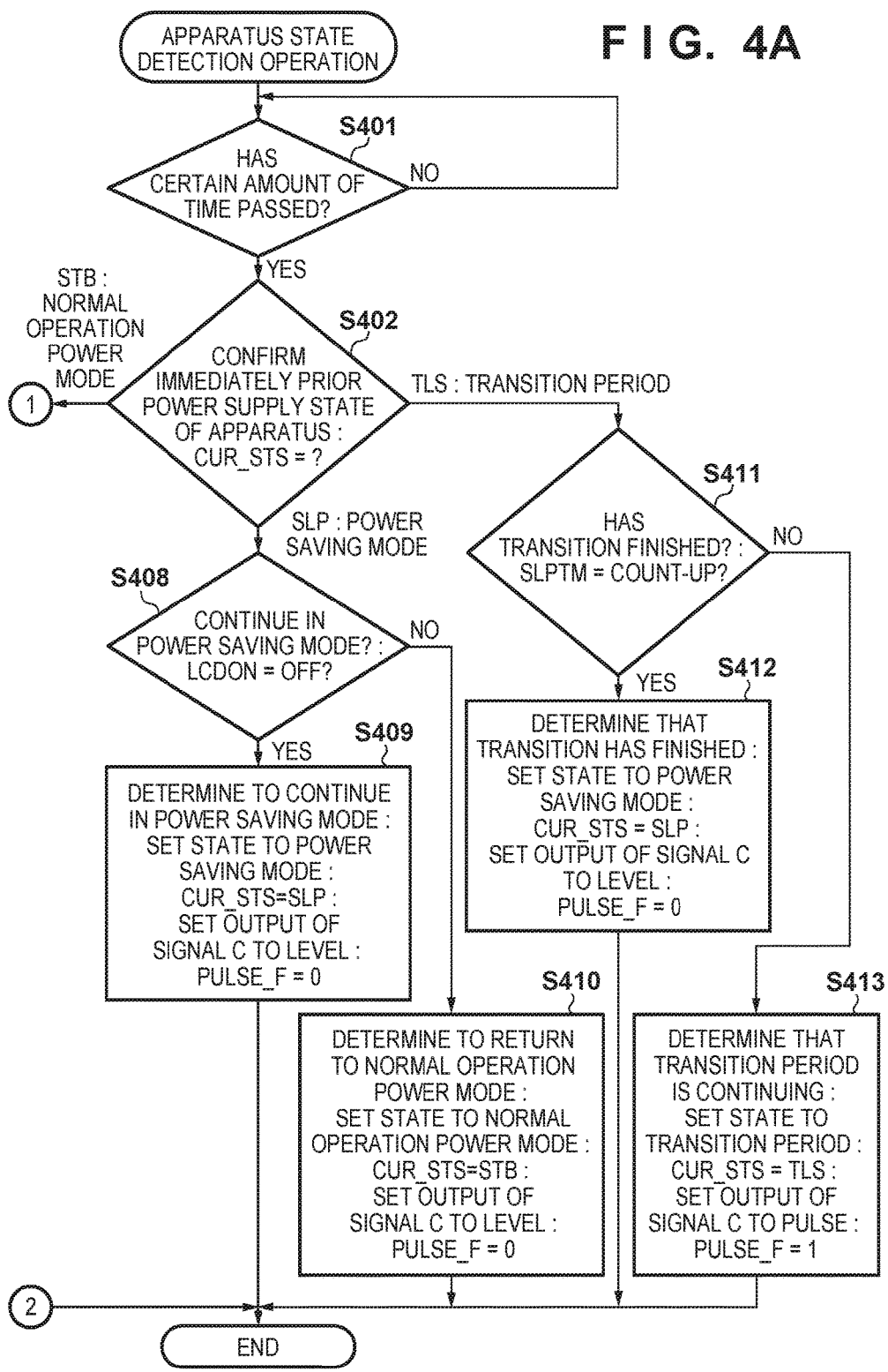

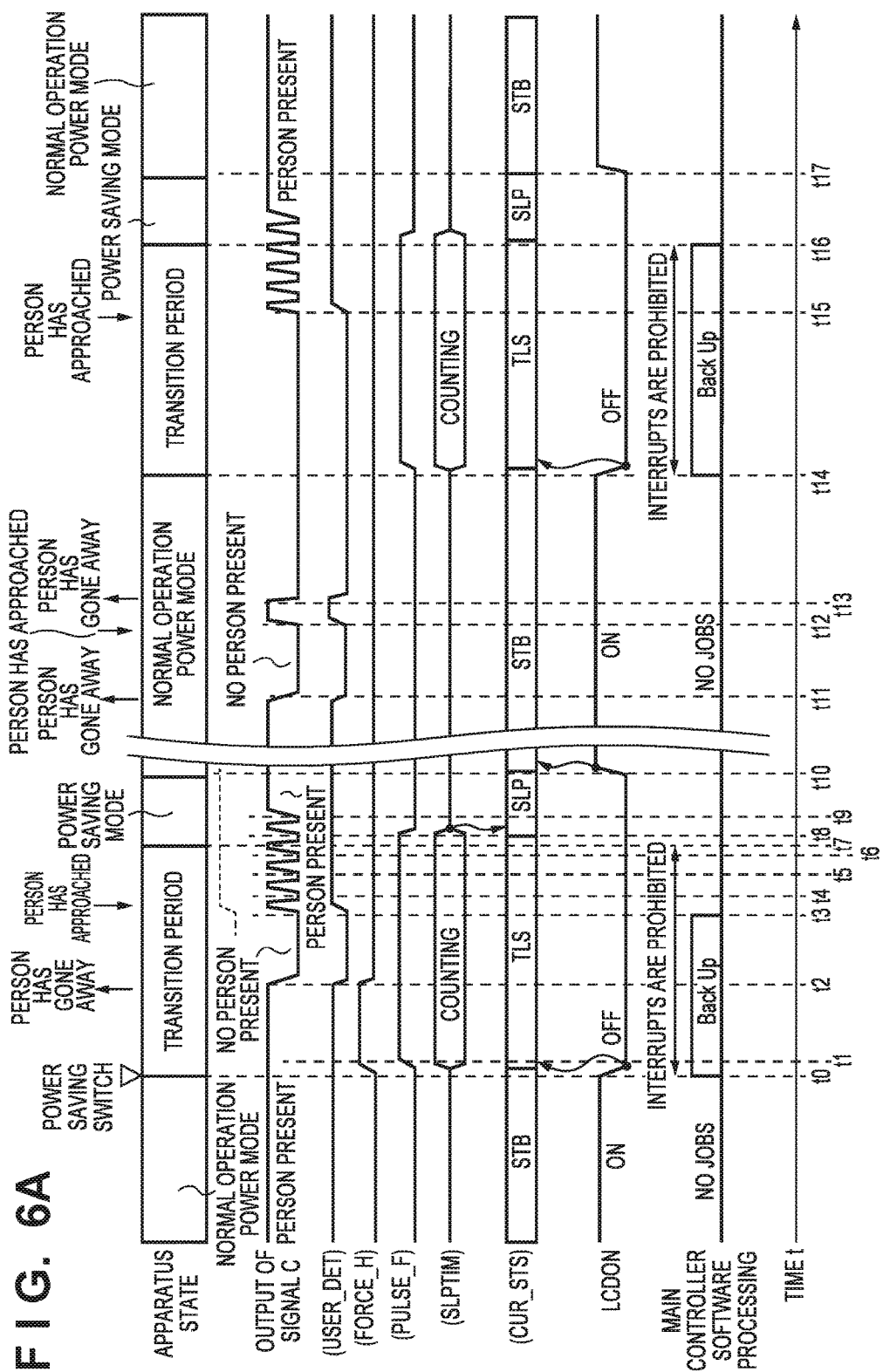

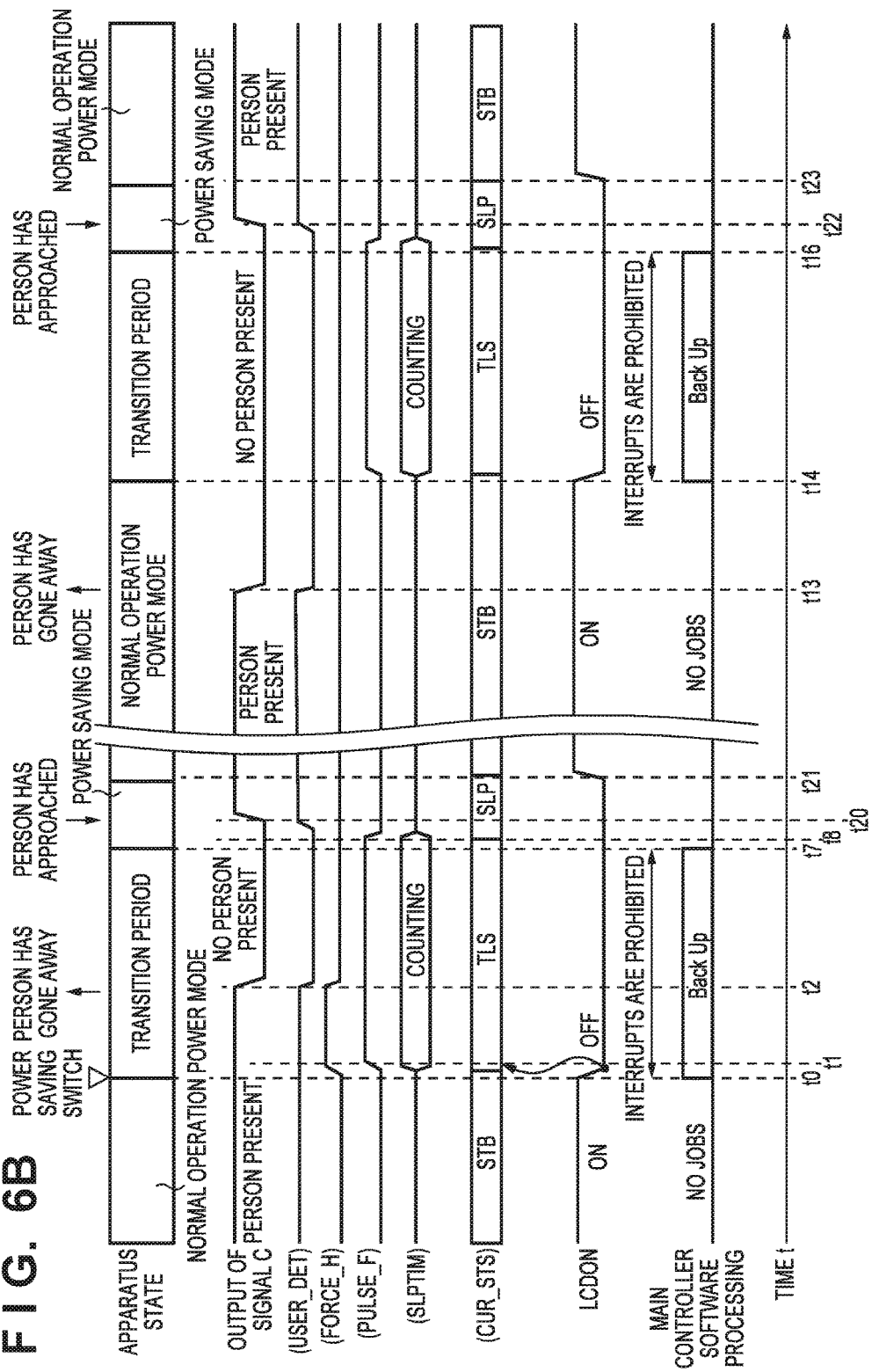

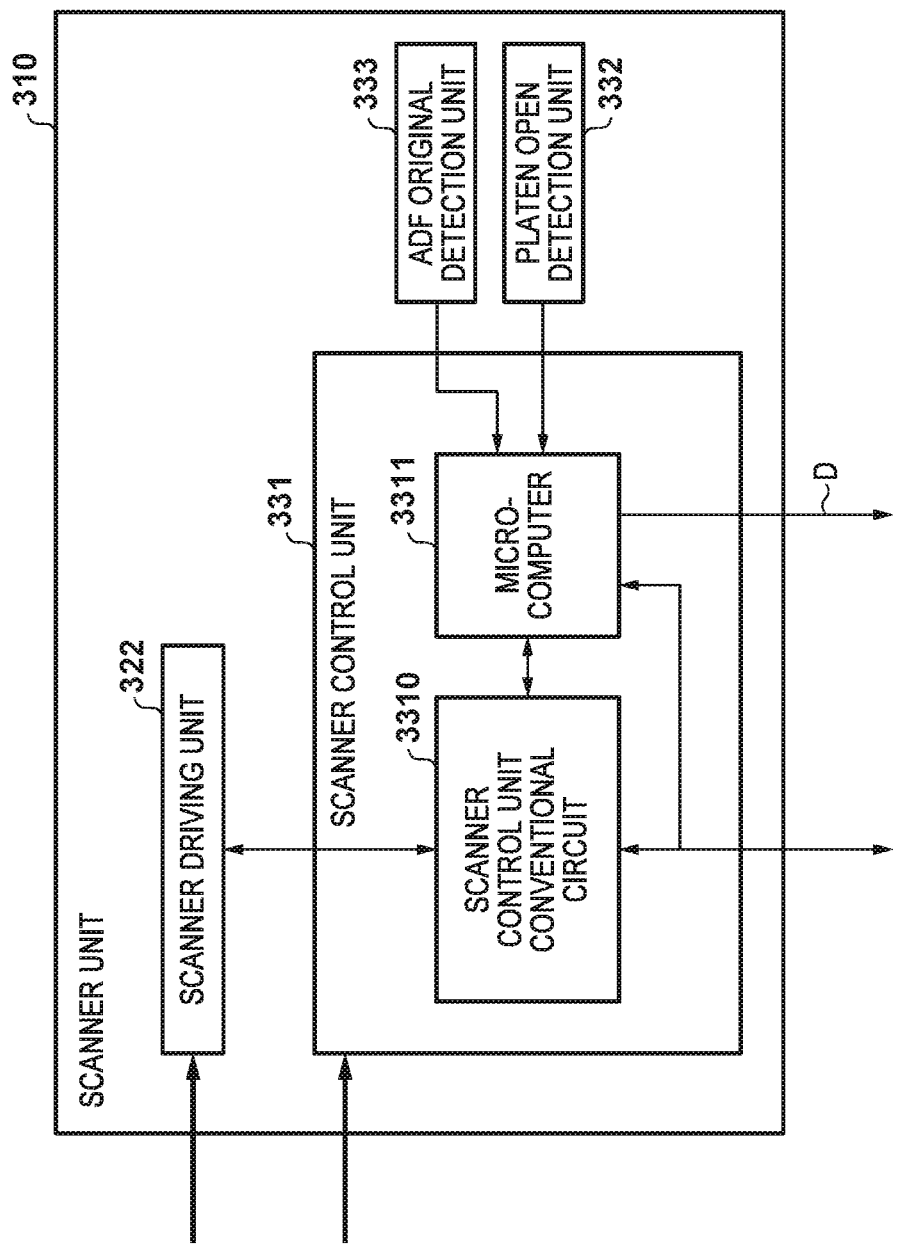

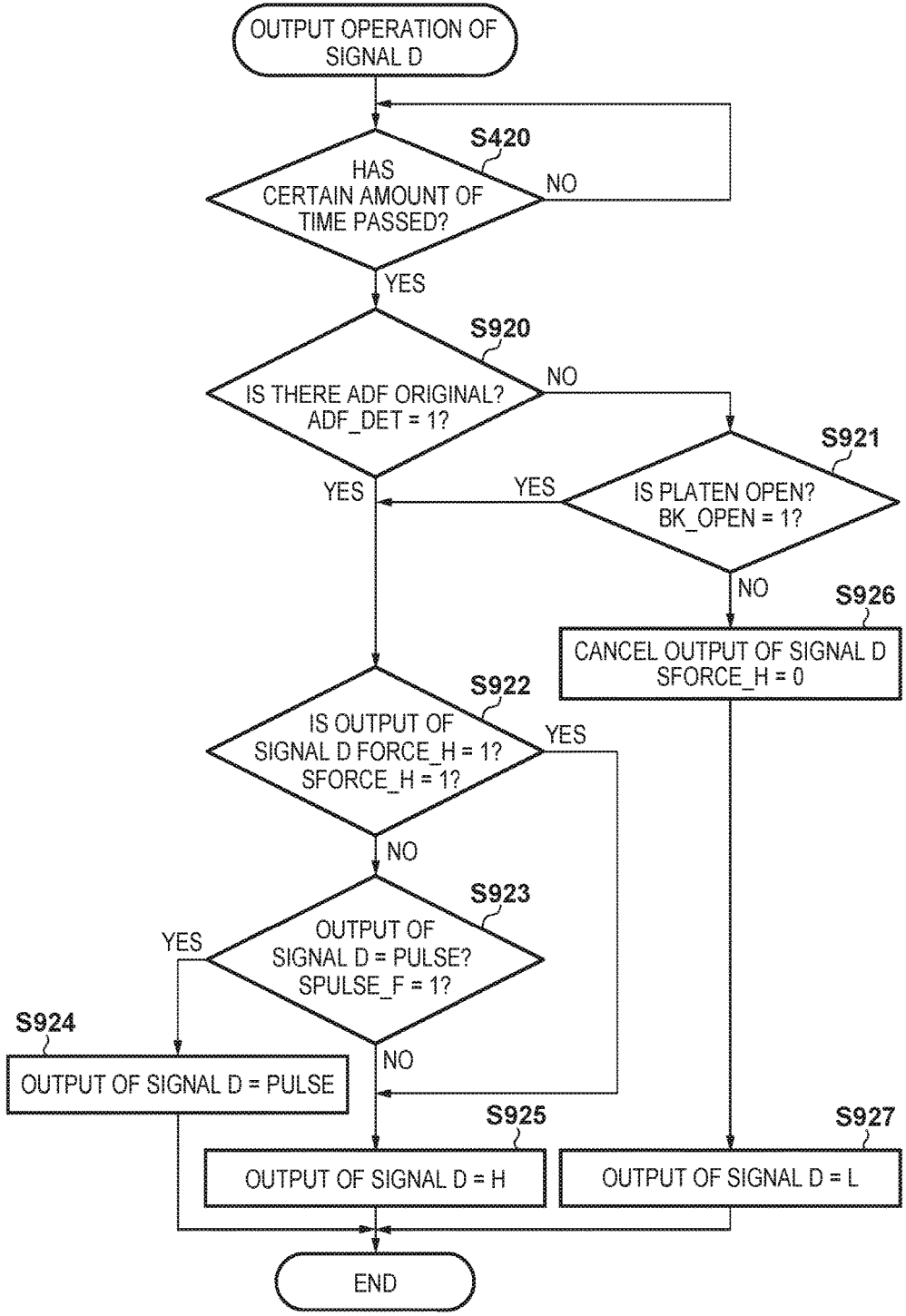

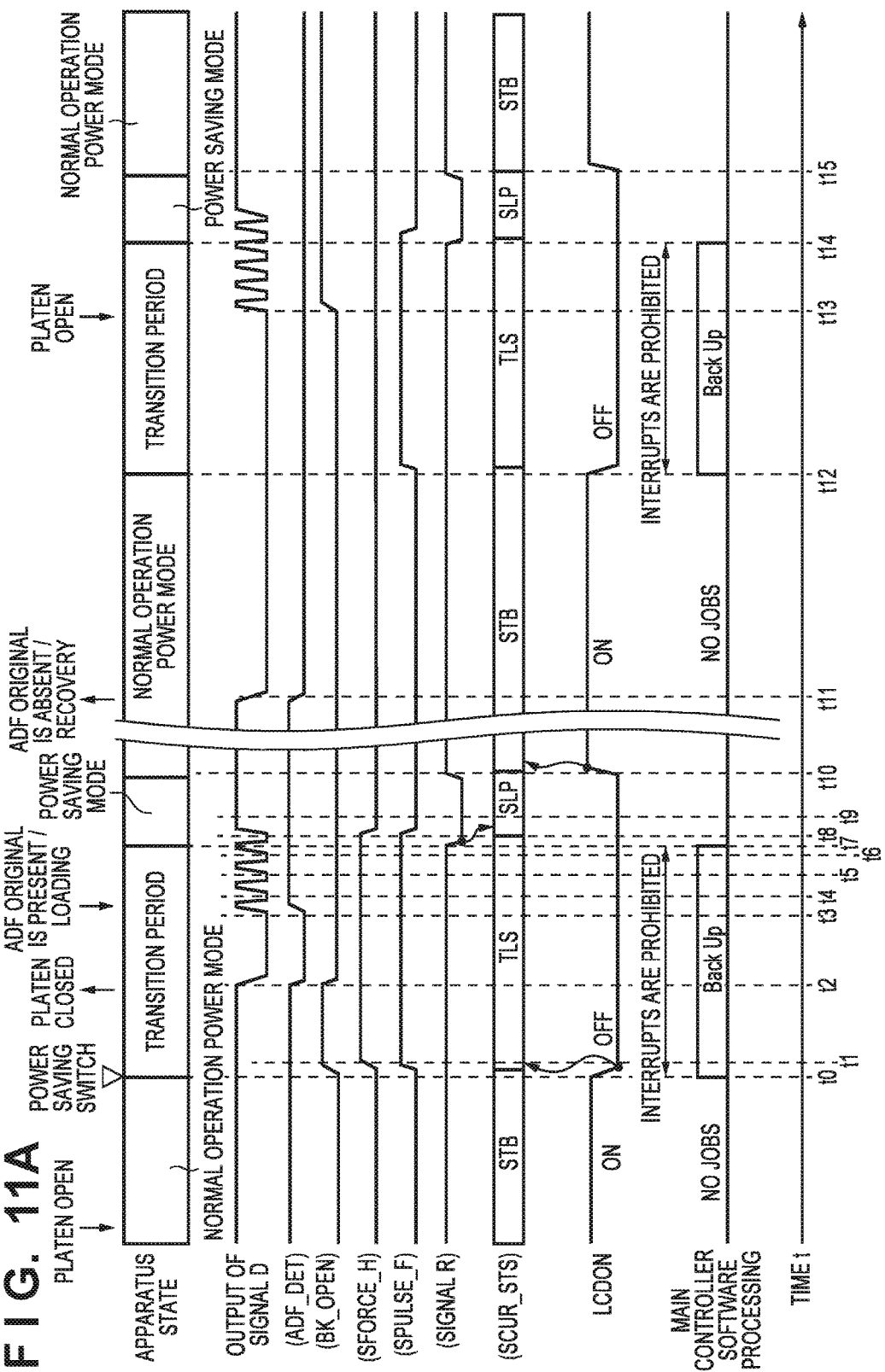

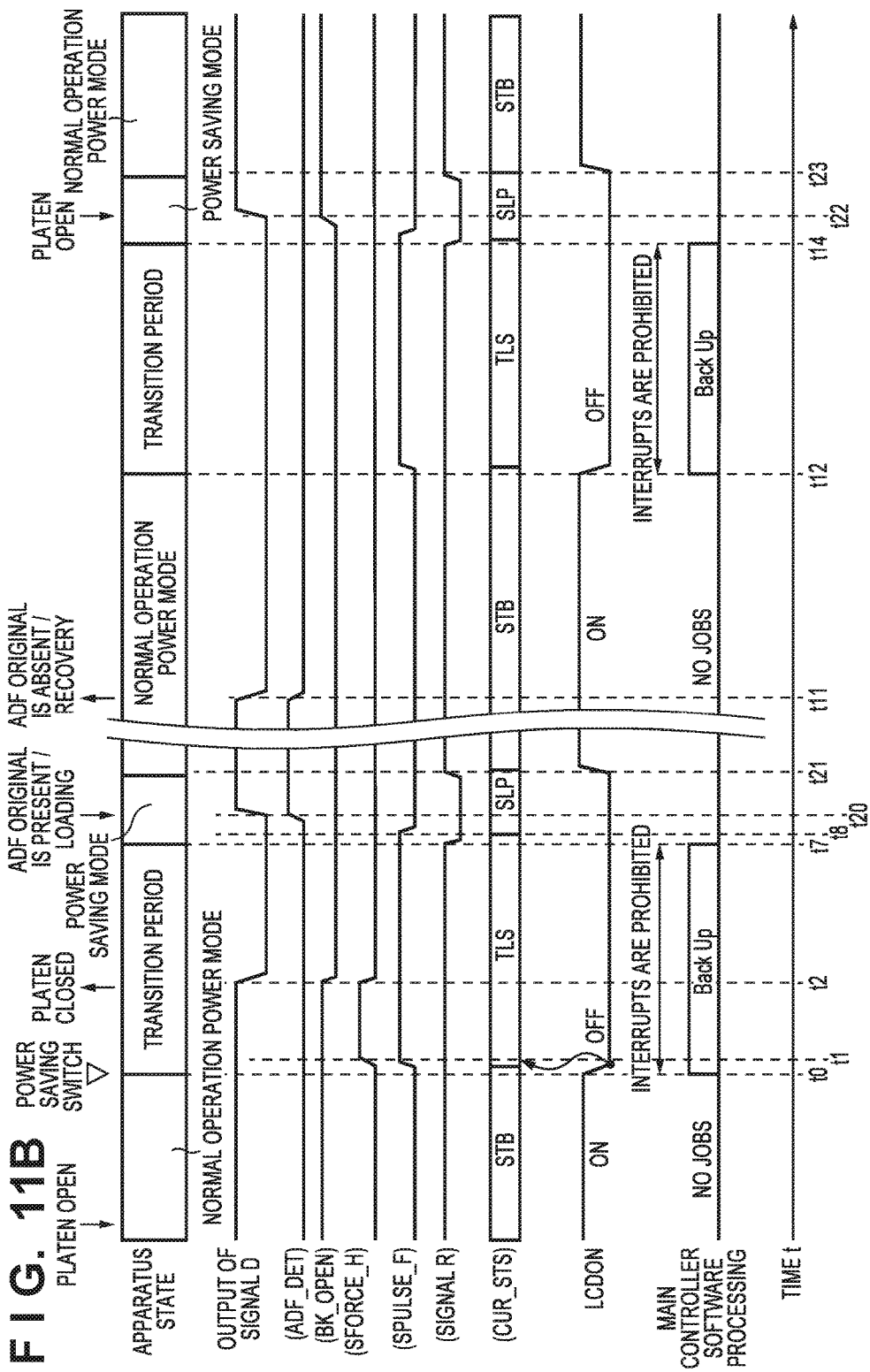

IMAGE PROCESSING APPARATUS, METHOD FOR CONTROLLING THE SAME, AND STORAGE MEDIUM

BACKGROUND OF THE INVENTION

Field of the Invention

The present invention relates to an image processing apparatus having a sleep function for reducing power consumption, a method for controlling the same, and a storage medium.

Description of the Related Art

Image processing apparatuses in recent years are provided with a function of switching between a power saving mode having low power consumption for power saving, and a normal operation power mode having high power consumption in which various job processing is executed. When a reason for return is detected during a time of the power saving mode, the image processing apparatus returns to the normal operation power mode from the power saving mode. Similarly, in a case of operating in the normal operation power mode, when a condition for transitioning to the power saving mode is ready, a transition is made to the power saving mode. By repeating the transition to the power saving mode and the return to the normal operation power mode, power saving for the apparatus is realized while guaranteeing convenience for a user.

Reasons for return to the normal operation power mode, include a reason for return that is based on a detection result by a human detection sensor, and a reason for return based on a detection result by an ADF (Auto Document Feeder) sensor. Other reasons for return include detection of input of a sheet to a manual feed tray, detection of input of a print job, detection of an incoming FAX, detection of an operation with respect to an operation unit, or the like.

Each detection unit such as a sensor makes an interrupt notification, to a main control unit of the image processing apparatus, of a return trigger based on a predetermined detection result, and the normal operation power mode is returned to when the return trigger is detected by the main control unit. In a human detection sensor or an ADF sensor, the occurrence of a user action in the power saving mode is set as a return trigger, and thus a configuration for returning upon detecting an edge interrupt is desirable. This is because, with a level interrupt, there is an increase of power consumption during the power saving mode or a delay in a return timing proportional to a polling interval.

Meanwhile, in the image processing apparatus, when transitioning to the power saving mode, an interrupt prohibition period for backing up the state of each module before and after the transition is provided. Japanese Patent No. 4843372 proposes a technique in which when backup processing ends, a power saving mode is transitioned into and interrupt prohibition is cancelled, and when there is an interrupt due to a reason for return, a normal operation power mode is returned to. Specifically, operations for transitioning to the power saving mode after the end of an interrupt prohibition period for backing up and returning to the normal operation power mode after detecting the input of a job which is a reason for return during the power saving mode are disclosed. Meanwhile, Japanese Patent No. 4843372 does not recite control regarding an interrupt that is generated in the interrupt prohibition period before transitioning to the power saving mode.

However, there is a problem as is recited below in the foregoing conventional technique. For example, in an image processing apparatus having a configuration where an interrupt prohibition period for backing up at the time of a transition to a power saving mode is provided, and an interrupt prohibition period notification cannot be made between a recovery interrupt output circuit and a main system that performs return processing, the recovery interrupt will be lost.

Specifically, at the time of transitioning to the power saving mode, because the image processing apparatus energizes a power-saving power supply system circuit and turns a normal power supply system circuit off, control by software is not possible even if a notification signal is provided during the interrupt prohibition period, and there is a necessity for a hardware construction. Accordingly, this leads to a cost increase. Accordingly, when an edge interrupt from a sensor such as a human detection sensor that cannot recognize the interrupt prohibition period is generated during the interrupt prohibition period for backing up, it is not possible to detect the edge interrupt. In such a case, because edge detection is not possible even after interrupt prohibition is cancelled, the image processing apparatus is not able to return to the normal operation power mode. In the case of an ADF sensor that makes an edge interrupt, there are similarly cases where detection of an original is not conveyed, and the state remains in the power saving mode.

SUMMARY OF THE INVENTION

The present invention enables realization of a mechanism with which an apparatus detects a rising edge of an interrupt signal, which is generated in an interrupt prohibition period at a time of a transition to a power saving mode, without adding a configuration that can handle the interrupt signal during the interrupt prohibition period.

One aspect of the present invention provides an image processing apparatus comprising: a first control unit that comprehensively controls the image processing apparatus; and a second control unit that controls a load, and notifies an interrupt signal generated in accordance with a change of state of the load to the first control unit, wherein the first control unit prohibits acceptance of the interrupt signal in a transition period where the image processing apparatus transitions from a first power mode to a second power mode having lower power consumption than the first power mode, and cancels the prohibition of interrupts when the transition to the second power mode completes, and the second control unit when the interrupt signal is generated during the transition period, repeatedly notifies the first control unit the interrupt signal as a pulse signal, and when prohibition of interrupts is cancelled by the first control unit, notifies the first control unit by changing the pulse signal to a level signal.

Another aspect of the present invention provides a method for controlling an image processing apparatus provided with a first control unit that comprehensively controls the image processing apparatus, and a second control unit that controls a load and notifies an interrupt signal generated in accordance with a change of state of the load to the first control unit, the method comprising: in the first control unit, prohibiting acceptance of the interrupt signal in a transition period where the image processing apparatus transitions from a first power mode to a second power mode having lower power consumption than the first power mode, and cancelling the prohibition of interrupts when the transition to the second power mode completes, and in the second control unit, when the interrupt signal is generated during the transition period, repeatedly notifying the first control unit the interrupt signal as a pulse signal, and when prohibition of interrupts is cancelled by the first control unit, notifying the first control unit by changing the pulse signal to a level signal.

Still another aspect of the present invention provides a non-transitory computer-readable storage medium storing a computer program for causing a computer to execute each step of a method for controlling an image processing apparatus provided with a first control unit that comprehensively controls the image processing apparatus, and a second control unit that controls a load and notifies an interrupt signal generated in accordance with a change of state of the load to the first control unit, the method comprising: in the first control unit, prohibiting acceptance of the interrupt signal in a transition period where the image processing apparatus transitions from a first power mode to a second power mode having lower power consumption than the first power mode, and canceling the prohibition of interrupts when the transition to the second power mode completes, and in the second control unit, when the interrupt signal is generated during the transition period, repeatedly notifies the first control unit the interrupt signal as a pulse signal, and when prohibition of interrupts is cancelled by the first control unit, notifies the first control unit by changing the pulse signal to a level signal.

Further features of the present invention will be apparent from the following description of exemplary embodiments with reference to the attached drawings.

BRIEF DESCRIPTION OF THE DRAWINGS

FIGS. 4A and 4B are views that illustrate an apparatus state determination flow of a microcomputer 514 according to an embodiment.

FIG. 6A is a timing chart that illustrates an operation for outputting an interrupt in a transition period according to an embodiment as a pulse to the signal C.

FIG. 6B is a timing chart that illustrates an operation for performing a level output for an interrupt that is not in a transition period according to an embodiment to the signal C.

FIG. 8A is a detailed block diagram of a scanner unit of the image processing apparatus 20 according to an embodiment.

FIG. 10 is a view for illustrating an output flow for an interrupt signal D of the microcomputer 3311 according to an embodiment.

FIG. 11A is a timing chart that illustrates an operation for outputting an interrupt, in a transition period according to an embodiment, as a pulse to the signal D.

FIG. 11B is a timing chart that illustrates an operation for performing a level output for an interrupt that is not in a transition period according to an embodiment to the signal D.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Overview Configuration of Image Processing Apparatus>

Figure 1:
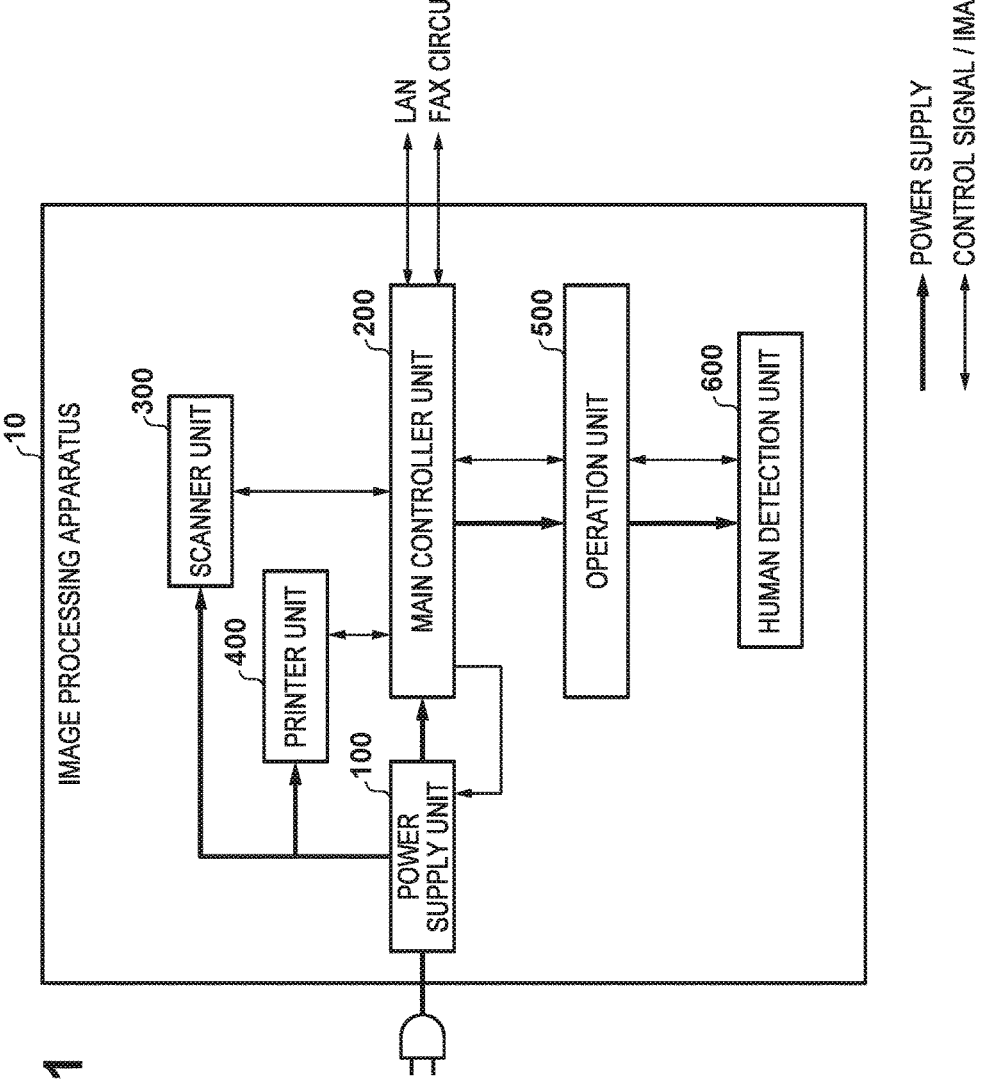
FIG. 1 is a simplified block diagram of an image processing apparatus 10 according to an embodiment.

Below, description will be given for a first embodiment of the present invention. Firstly, with reference to FIG. 1, explanation is given regarding an overview configuration of an image processing apparatus 10 according to the present embodiment. The image processing apparatus 10 is an MFP (Multi Function Peripheral) that is provided with a plurality of functions, such as a print function, a scanner function, a copy function, and a FAX function. Note that the present invention can be applied to a variety of image processing apparatuses, such as a copying machine, a scanner, and a facsimile apparatus.

The image processing apparatus 10 is configured by including a power supply unit 100, a main controller unit (a first control unit) 200, a scanner unit 300, a printer unit 400, an operation unit 500, and a human detection sensor unit 600. Furthermore, the image processing apparatus 10 has at least two power modes, having a normal operation power mode for executing a copy operation or the like, and a power saving mode that has less electric power consumption than that. In a case where this apparatus has not been used after a certain amount of time has passed, the main controller unit 200 controls the power supply unit 100 to cause the power mode of the apparatus to transition from the normal operation power mode to the power saving mode. While transitioning to the power saving mode, a power supply for the scanner unit 300, the printer unit 400 and the like is stopped, and a power supply to unnecessary locations inside the operation unit 500 and a portion of the inside of the main controller unit 200 is also stopped. The human detection sensor unit 600 is operating in the power saving mode, and it is possible to detect a user's intention to use the image processing apparatus 10 and cause a return from the power saving mode to the normal operation power mode.

<Detailed Configuration of Image Processing Apparatus>

Figure 2:
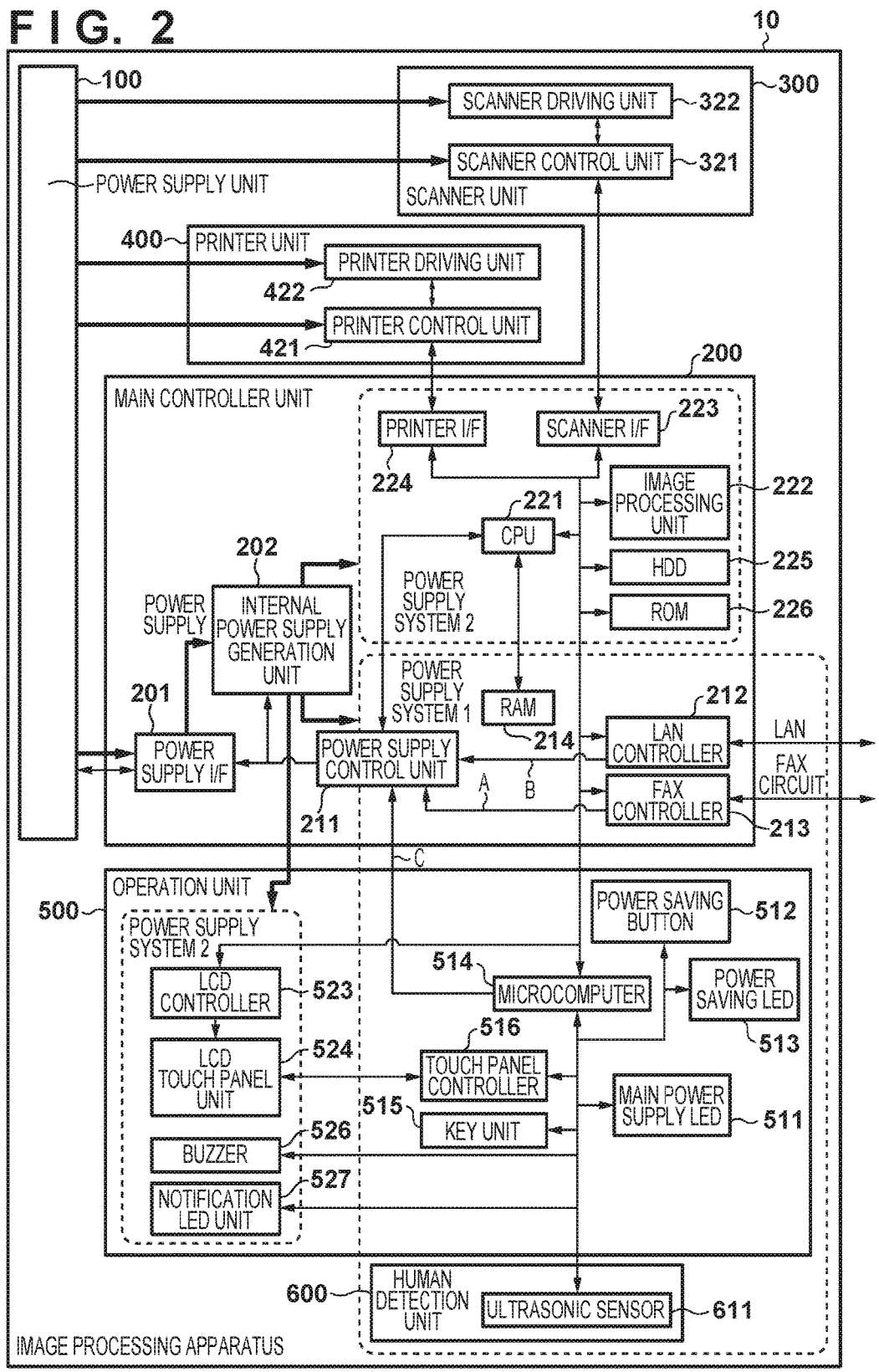
FIG. 2 is a detailed block diagram of the image processing apparatus 10 according to an embodiment.

Next, with reference to FIG. 2, explanation is given regarding a detailed configuration of the image processing apparatus 10 according to the present embodiment. The scanner unit 300 optically reads an image from an original and generates image data. The scanner unit 300 has a scanner control unit 321 and a scanner driving unit 322. The scanner driving unit 322 includes a driving unit for causing a read head for reading an original to move, and a driving unit (ADF, auto document feed unit) for conveying an original to a reading position. The scanner control unit 321 controls operation of the scanner driving unit 322. The scanner control unit 321 receives, in accordance with communication with the main controller unit 200, setting information that is set by a user when they are performing scanner processing, and controls operation of the scanner driving unit 322 based on the setting information.

The printer unit 400 forms an image on a print medium (a sheet) in accordance with an electrophotographic method. The printer unit 400 has a printer control unit 421 and a printer driving unit 422. The printer driving unit 422 includes at least a motor for causing a photosensitive drum (not shown) to rotate, a mechanical unit for pressurizing a fixing device, and a heater. The printer control unit 421 controls operation of the printer driving unit 422. The printer control unit 421 receives, in accordance with communication with the main controller unit 200, setting information that is set by a user when they are performing print processing, and controls operation of the printer driving unit 422 based on the setting information.

The main controller unit 200 executes image data processing that processes image data inputted from the scanner unit 300 or a FAX circuit, and outputs to the printer unit 400. In addition, the main controller unit 200 performs comprehensive operation control of the image processing apparatus 10, including the scanner unit 300 and the printer unit 400, in accordance with a user instruction inputted to the operation unit 500. In addition, the main controller unit 200 controls a power mode of the image processing apparatus 10 by performing operation control of the power supply unit 100.

The inside of the main controller unit 200 is divided into at least two power supply systems: a power supply system 1 for a circuit portion where operation is necessary even during the power saving mode, and a power supply system 2 for a circuit portion where operation during the power saving mode is unnecessary. Each unit of the power supply system 1 is always supplied with power by an internal power supply generation unit 202 which receives a power supply from a power supply I/F 201. A power supply control unit 211, a FAX controller 213, and a LAN controller 212 are connected to the power supply system 1 so that support is possible if a FAX is received or a print request is made from the network, even when the apparatus is in the power saving mode.

Connected to the power supply system 2 are a ROM 226 that is necessary at a time of activation, an HDD 225, a printer I/F 224, a scanner I/F 223, and an image processing unit 222 that are necessary at a time of a copy operation, and these are not energized at a time of the power saving mode. When one of interrupt signals A through C is inputted from a connection destination during the power saving mode, the power supply control unit 211 controls the internal power supply generation unit 202 to energize the power supply system 2 and cancel the power saving mode.

The interrupt signal A is a signal that the FAX controller 213 outputs upon receiving a FAX from a FAX circuit. The interrupt signal B is a signal that the LAN controller 212 outputs upon receiving a print job packet or a state confirmation packet from a LAN. The interrupt signal C is a signal outputted from a microcomputer (a second control unit) 514 inside the operation unit 500, and it is outputted when the human detection sensor unit 600 detects a user or when a power saving button 512 is pressed. When the power supply system 2 inside the main controller unit 200 is also energized in accordance with one of the interrupt signals A through C, a CPU 221 reads a state from a RAM 214 for which a self-refresh operation is always performed in the power supply system 1, in order to cause the apparatus to return to the state before the transition to the power saving mode.

Subsequently, when the image processing apparatus 10 has returned to the normal power mode, processing in accordance with the reason for return for the interrupt signals A through C is performed by the CPU 221.

The CPU 221 of the main controller unit 200 outputs an LCDON signal for instructing the backlight of an LCD panel (a display unit) of the operation unit 500 to be turned on or turned off. The CPU 221 instructs that the LCD be turned on by the LCDON signal only when in the normal power mode. The operation unit 500 has an LCD touch panel unit 524 in which an LCD panel and a touch panel are integrated, a key unit 515 for detecting a key operation by a user such as a numeric keypad or a start key, and a buzzer 526. The LCD touch panel unit 524 turns the backlight of the LCD panel on or off in accordance with the LCDON signal received from the CPU 221 of the main controller unit 200. Generated image data that an LCD controller 523 receives from the CPU 221 of the main controller unit 200 is rendered by the LCD touch panel unit 524.

When a user touches the screen of the LCD touch panel unit 524 to perform an operation, a touch panel controller 516 analyzes coordinate data of a touched location, notifies this data to the microcomputer 514, and the microcomputer 514 notifies this data to the CPU 221. The microcomputer 514 periodically scans for an operation of the key unit 515, and notifies the CPU 221 if there is an operation by a user on the key unit 515. The CPU 221, having received a notification that there is a user operation with respect to the LCD touch panel unit 524 or the key unit 515, causes the image processing apparatus 10 to operate in accordance with the detail of the operation.

In addition, a plurality of types of LEDs are integrated in the operation unit 500. A main power supply LED 511 is always turned on when a main power supply of the image processing apparatus 10 is turned on. A notification LED Unit 527 is controlled by the microcomputer 514, and notifies a state of the image processing apparatus 10, such as that an error has occurred or that a job is being executed, to a user.

The internals of the operation unit 500 are divided into at least two power supply systems: the power supply system 1 for a circuit portion where operation is necessary even during the power saving mode, and the power supply system 2 for a circuit portion where operation during the power saving mode is unnecessary. The microcomputer 514, the main power supply LED 511, the power saving button 512, the touch panel controller 516, and the key unit 515 are connected to the power supply system 1. In the power saving mode, power supply is disconnected for the LCD controller 523, the LCD touch panel unit 524, the buzzer 526, and the notification LED Unit 527, which are connected to the power supply system 2.

The human detection sensor unit 600 is connected to the power supply system 1, and can detect movement of a person who approaches the image processing apparatus 10, for example, even in the power saving mode. Determination of movement of a person is performed by the microcomputer 514 periodically reading and processing a state of an ultrasonic sensor 611. The ultrasonic sensor 611 according to the present embodiment uses a sensor that performs operations for oscillation and reception of an ultrasonic wave by one element, but an element for oscillation and an element for reception may be separately provided.

The microcomputer 514 inputs a 40 KHz oscillation signal to the ultrasonic sensor 611 for a certain amount of time, and subsequently determines the presence of a user by processing a detection waveform result of the ultrasonic wave inputted to the ultrasonic sensor 611. When it is determined that a user is present, the microcomputer 514 outputs the interrupt signal C to the power supply control unit 211. Upon receiving an energization request signal, the power supply control unit 211 controls the power supply unit 100 to cause the power mode of the apparatus to return to the normal operation power mode. Note that, power supply to the human detection sensor unit 600 may be performed directly from the power supply unit 100, in accordance with a configuration of the apparatus.

<Detection Area>

Figure 3:
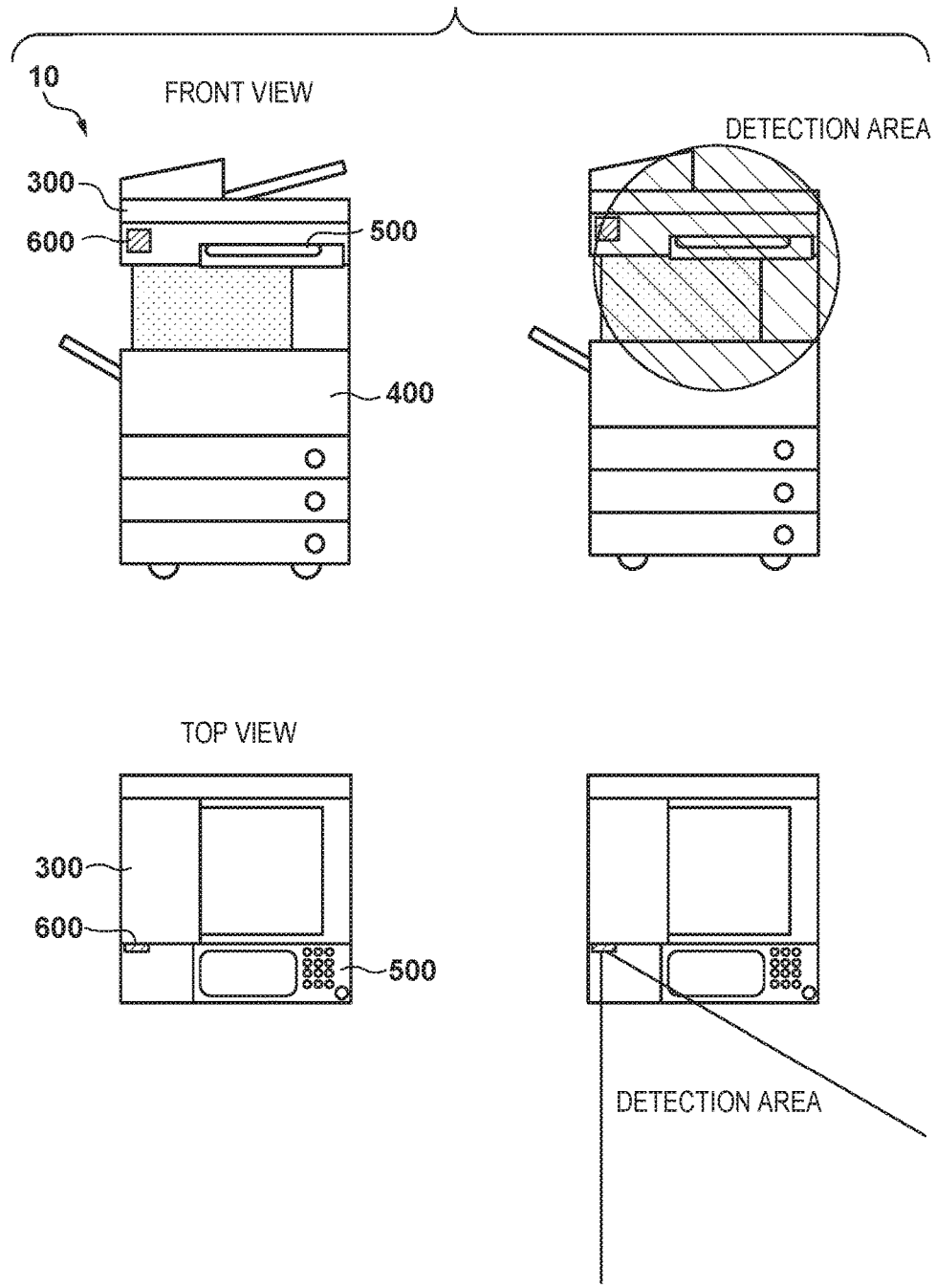
FIG. 3 is a view illustrating a detection area of a human detection sensor according to an embodiment.

Next, with reference to FIG. 3, explanation is given regarding a detection area of a human detection sensor according to the present embodiment. The human detection sensor unit 600 according to the present embodiment is an ultrasonic sensor, outputs an ultrasonic wave, and receives an ultrasonic wave that hits an object and reflects. It is possible to estimate a distance to the object in accordance with the amount of time to receive the reflected ultrasonic wave.

For the image processing apparatus 10, the detection area of the human detection sensor unit 600 is set to face forward from a main body unit or slightly downward, so that it is possible to detect an ultrasonic wave that reflects from a human body. The detection area is set so that it is possible to detect a reflected wave from a person separated approximately 2 m from the main body, and it is possible to detect a person present within a region having the same width as the width of the main body, 30 cm in front of the main body. An installation location of the human detection sensor unit 600 is a front surface of the scanner unit 300 and a side opposite of the operation unit 500. It is arranged tilted toward the operation unit 500 so that detection of a user who stands in from of the operation unit 500 is possible from the human detection sensor unit 600.

<Determination of Apparatus State>

Figure 4B:
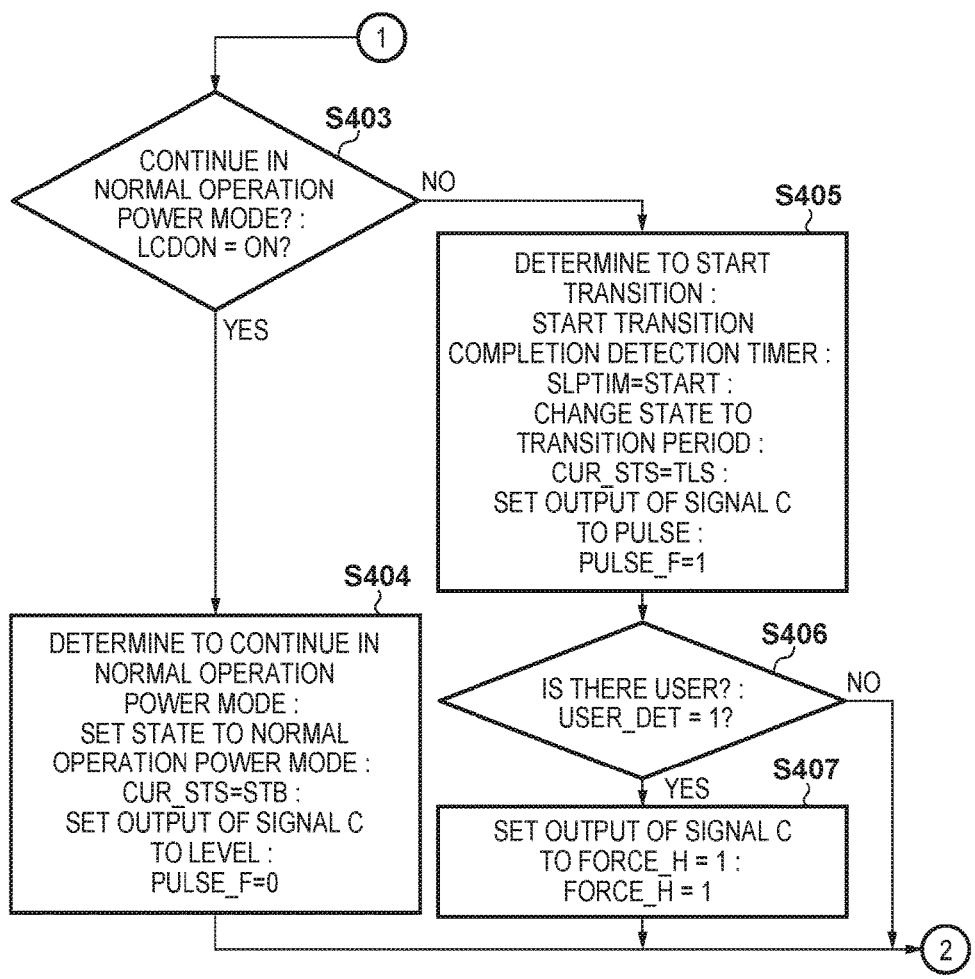

Next, with reference to FIGS. 4A and 4B, explanation is given regarding a processing procedure for determining a state of the apparatus in the microcomputer 514 of the image processing apparatus 10. The microcomputer 514 is connected to the aforementioned power supply system 1, and is in an operable state because it is supplied with power even during the power saving mode.

Firstly, in step S401, the microcomputer 514, which confirms and updates the state of the apparatus every time a certain amount of time passes, determines whether the certain amount of time has passed. If it has passed the processing proceeds to step S402. If that is not the case, the determination of step S401 repeats. In step S402, the microcomputer 514 confirms a value of CUR_STS which stores an immediately prior state (the apparatus state that was determined the previous time), and performs a confirmation for the present state with consideration given to the immediately prior state. CUR_STS is a portion of a register or a memory of the microcomputer 514, and holds a value of three states that can be taken as states of the apparatus: STB (the normal operation power mode), SLP (the power saving mode), and TLS (a transition period). If CUR_STS is STB=the normal operation power mode the processing proceeds to step S403, if CUR_STS is SLP=the power saving mode the processing proceeds to step S408, and if CUR_STS is TLS=a transition period the processing proceeds to step S411.

In step S403, the microcomputer 514 determines whether LCDON, which is notified from the CPU 221 of the main controller unit 200, is instructing to turn on the LCD. If the immediately prior state is the normal operation power mode and LCDON is for turning on the LCD, the microcomputer 514 determines to continue in the normal operation power mode and the processing proceeds to step S404. If the immediately prior state is the normal operation power mode and LCDON is for turning off the LCD, the microcomputer 514 determines to start a transition to the power saving mode, and the processing proceeds to step S405.

In a case where continuing in the normal operation power mode is determined, in step S404, the microcomputer 514 sets CUR_STS to STB for the next state confirmation, sets PULSE_F to 0 for setting output of the signal C to be level, and the processing ends. Meanwhile, in a case where starting a transition to the power saving mode is determined, in step S405, the microcomputer 514 sets CUR_STS to TLS for the next state confirmation, sets PULSE_F to 1 for setting output of the signal C to a pulse, and causes a completion detection timer for detecting completion of the transition to start. In step S406, the microcomputer 514 determines whether a user is present near the apparatus, if a user is not present the processing ends, and if present the processing proceeds to step S407. In step S407, because a transition is to be made to the power saving mode in accordance with a user pressing the power saving button 512, the microcomputer 514 sets FORCE_H=1 for output of the signal C so that a return is not made by detection of the same user immediately after the transition, and the processing ends. User detection processing is performed in step S421 in the flow of FIG. 5 which is explained later, and in step S406 a determination is made by a value of USER_DET which stores a detection result.

Meanwhile, if CUR_STS is SLP=the power saving mode, in step S408, the microcomputer 514 confirms whether LCDON which is notified from the CPU 221 of the main controller unit 200 is instructing to turn off the LCD. Specifically, if the immediately prior state is the power saving mode and LCDON is for turning off the LCD, the microcomputer 514 determines to continue the power saving mode, and the processing proceeds to step S409, whereas if the immediately prior state is the power saving mode and LCDON is for turning on the LCD, the microcomputer 514 determines to return to the normal operation power mode, and the processing proceeds to step S410.

In a case where continuing in the power saving mode is determined, in step S409, the microcomputer 514 sets CUR_STS to SLP for the next state confirmation, sets PULSE_F to 0 for setting output of the signal C to be level, and the processing ends. Meanwhile, in a case where returning the normal operation power mode is determined, in step S410, the microcomputer 514 sets CUR_STS to STB for the next state confirmation, sets PULSE_F to 0 for setting output of the signal C to be level, and the processing ends.

Meanwhile, if CUR_STS is TLS=a transition period, in step S411, the microcomputer 514 confirms whether a power saving mode transition completion detection timer has finished counting. If the immediately prior state is a transition period and counting has finished, it is determined that the transition has completed and the processing proceeds to step S412, whereas if the immediately prior state is the transition period and counting is in progress, it is determined that the transition period is continuing and the processing proceeds to step S413.

If it is determined that transition has completed, in step S412, the microcomputer 514 sets CUR_STS to SLP for confirmation of the next state, sets PULSE_F to 0 for setting the output of the signal C to be level, and this processing ends. Meanwhile, in a case where it is determined that the transition period is continuing, in step S413, the microcomputer 514 sets CUR_STS to TLS for the next state confirmation, sets PULSE_F to 1 for setting output of the signal C to be pulsed, and the processing ends.

<Signal C Output Operation>

Figure 5:
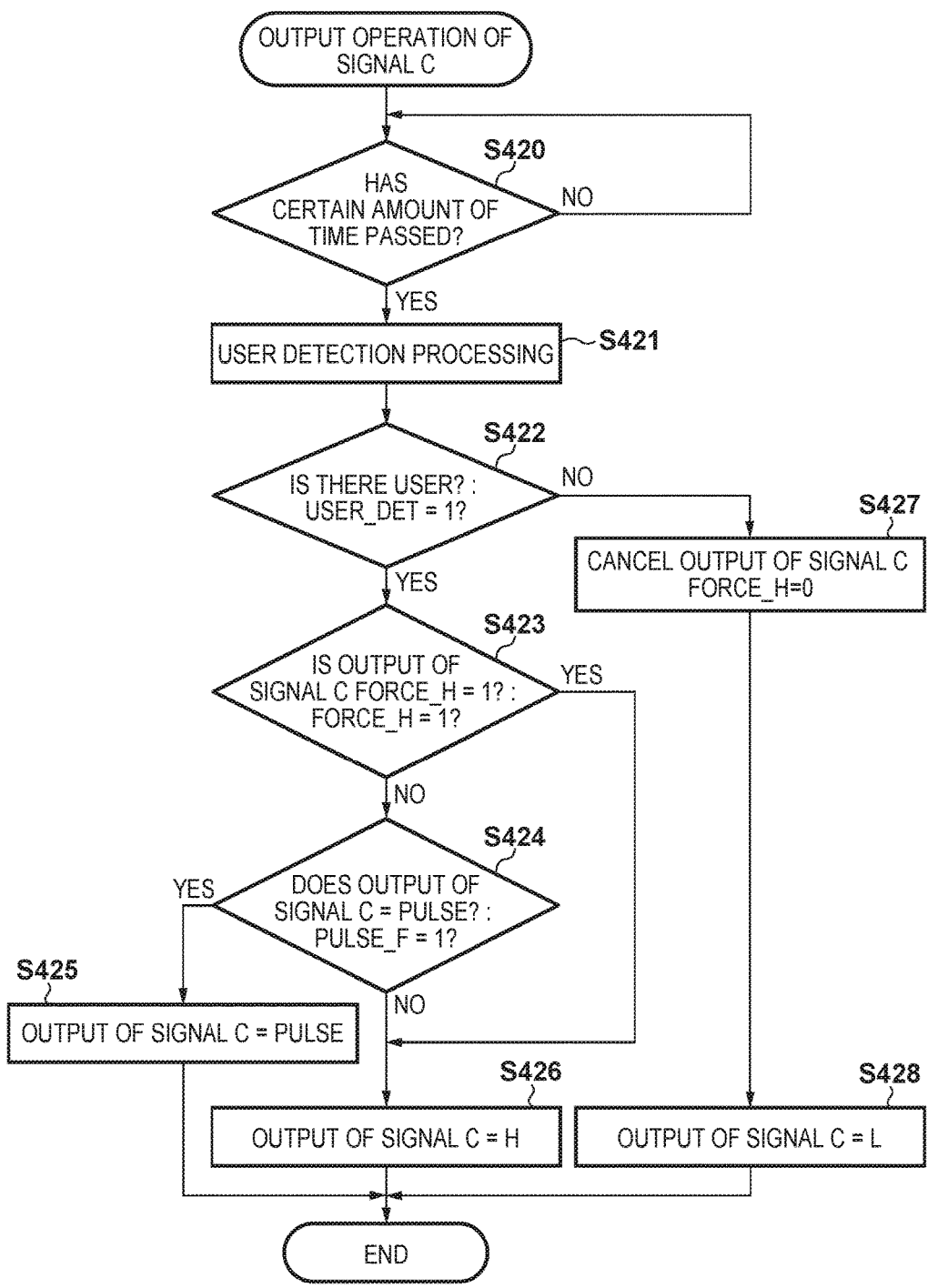
FIG. 5 is a view that illustrates an output flow for an interrupt signal C of the microcomputer 514 according to an embodiment.

Next, with reference to FIG. 5, explanation is given regarding control for switching output operation of the signal C in accordance with an apparatus state, in the microcomputer 514 of the image processing apparatus 10 according to the present embodiment. Processing explained below is executed by the microcomputer 514.

In step S420, the microcomputer 514 determines whether a certain amount of time has passed. If it has passed the processing proceeds to step S421. In step S421, the microcomputer 514 controls the ultrasonic sensor 611 to transmit and receive an ultrasonic wave, and determines a presence of a user from an ultrasonic wave detection waveform result. If it is determined that a user is present, the microcomputer 514 sets USER_DET to 1, and if a user is not present the microcomputer 514 sets USER_DET to 0.

Next, in step S422, the microcomputer 514 determines whether the detection result is that a user is present. If present the processing proceeds to step S423, and if not present the processing proceeds to step S427. In step S423, the microcomputer 514 determines whether to transition to the power saving mode in accordance with the power saving button 512. Specifically, the microcomputer 514 determines whether to transition to the power saving mode in accordance with the power saving button 512, by determining whether FORCE_H=1 is set for the output of the signal C. If set the processing proceeds to step S426, and if not set the processing proceeds to step S424. When a determination is made not to transition to the power saving mode in accordance with the power saving button 512, in step S424, the microcomputer 514 determines whether a pulse setting has been made for output of the signal C. If a pulse setting has been made the processing proceeds to step S425, and if not the processing proceeds to step S426.

In step S426, the microcomputer 514 sets output of the signal C to H, and the processing ends. Meanwhile, in step S425, the microcomputer 514 sets output of the signal C to pulse, and the processing ends.

Meanwhile, if a detection result in step S422 is that a user is not present the processing proceeds to step S427, and the microcomputer 514 cancels FORCE_H=1 for the output of the signal C, and, in step S428, sets the output of the signal C to L, and the processing ends.

<Timing Chart>

Next, with reference to FIG. 6A and FIG. 6B, explanation is given regarding output timing of the signal C when a user approaches or separates from the image processing apparatus 10, when the apparatus state is in each of the normal operation power mode, the power saving mode, and a transition period. Here, explanation is given regarding a method of preventing an interrupt that is generated in a transition period, which prohibits interrupts, from being lost, in the image processing apparatus 10 according to the present embodiment.

FIG. 6A illustrates an operation in which an interrupt generated in a transition period is continuously outputted as a pulse until after the end of the transition period and returned to a level output after the end of the transition period, and two operations for transitioning to the power saving mode due to the existence or absence of the press of the power saving button and level output at the time of the normal operation power mode. FIG. 6B illustrates an operation for level output at the time of an interrupt generated during a power saving mode.

At a time t0, a user who is present near the apparatus presses the power saving button 512, and causes a transition to the power saving mode to start. Accordingly, because a user is present near the image processing apparatus 10, USER_DET is already set to 1. The CPU 221 of the main controller unit 200 starts a transition to the power saving mode after a notification that the power saving button 512 has been pressed, and prohibits interrupts due to the backup processing. The interrupt prohibition period is from t0 to t7.

At the time t1, the microcomputer 514 determines to start the transition when the immediately prior CUR_STS is set to STB (step S402) and when LCDON is currently L=turned off (step S403). Upon determining to start the transition, the microcomputer 514 starts a timer SLPTIM, sets CUR_STS to TLS, and sets PULSE_F to 1 (step S405). Furthermore, the microcomputer 514 sets FORCE_H to 1 because USER_DET is 1.

A time t2 indicates a timing when the user that was near has moved away. Here, the microcomputer 514 detects that the user has moved away from the waveform of the human detection sensor unit 600 by user detection processing (step S421). In such a case, the microcomputer 514 sets USER_DET to 0 and sets FORCE_H to 0 (step S427), and sets the signal C to L (step S428).

A time t3 indicates that a person has approached the image processing apparatus 10 again. The microcomputer 514 detects that a user is present from the waveform of the human detection sensor unit 600 by user detection processing (step S421), and sets USER_DET to 1.

The microcomputer 514 confirms that FORCE_H is 0 (step S423), and, because PULSE_F=1 (step S424), outputs a pulse to the signal C (step S425).

At a time t4, the microcomputer 514, after a certain amount of time passes (step S401), identifies that the immediately prior apparatus state is a transition period (step S402), and, because the transition completion detection timer SLPTIM is counting (step S411), determines that the transition period is continuing (step S413). As the output operation of the signal C, the microcomputer 514, after the certain amount of time has passed (step S420), executes user detection (step S421), and because FORCE_H is 0 (step S423) and PULSE_F is 1 (step S424), a pulse is output to the signal C again (step S425).

The microcomputer 514 repeats step S401 to step S425 until counting completes for SLPTIM. By this, it is not possible to detect an edge of an interrupt signal generated in the interrupt prohibition period during a transition period, but instead it is possible to detect an edge of the pulse output at a stage of having transitioned to the power saving mode by repeating the pulse output. Therefore, at a timing of having transitioned to the power saving mode, the power supply control unit 211 can reliably perform user detection as explained in detail below.

At a time t7 the image processing apparatus 10 transitions to the power saving mode. The microcomputer 514 determines that the apparatus in a transition period (step S413) because SLPTIM is being counted immediately prior to the time t7, and outputs a pulse to the signal C again (step S425). Because the power supply control unit 211 of the main controller unit 200 cannot capture a rising edge immediately prior to the time t7, return processing is not performed at the time where the power saving mode is entered at the time t7.

At a time t8, SLPTIM finishes counting. At a time t9, the microcomputer 514 detects that counting by SLPTIM has finished (step S411), determines that the transition has completed, set CUR_STS to SLP, sets output of the signal C to be level, and thus sets PULSE_F to 0. As the output operation of the signal C, the microcomputer 514, at the time t9 after the certain amount of time has passed (step S414), executes user detection (step S421), and because FORCE_H is 0 (step S423) and PULSE_F is 0 (step S424), this time the signal C is set to level output at H (step S426).

At a time t9, the power supply control unit 211 of the main controller unit 200 detects that the edge output of the signal C has changed from L to H, and starts an operation to return to the normal operation power mode. In this way, although the pulse from the time t3 to t7 is not conveyed because it is in an interrupt prohibition period, the rising edge of the time t9 can be detected by the power supply control unit 211 because it arrives in a state where interrupt prohibition has been cancelled.

At a time t10, power is supplied to the power supply system 2 which includes the CPU 221 of the main controller unit 200, the apparatus state becomes the normal operation power mode, and the CPU 221 sets the LCDON signal to H.

Because LCDON is on (step S408), the microcomputer 514 determines that the normal operation power mode has been returned to, sets CUR_STS to STB, and sets output of the signal C to level (step S410). Until a time t11, the image processing apparatus 10 performs job processing or the like. Because LCDON remains on, the microcomputer 514 continues the normal operation power mode, and continues level output of the signal C as H because a user continues to be detected.

The time t11 indicates that the user has separated from the image processing apparatus 10 due to their job ending. The microcomputer 514 continues the normal operation power mode because LCDON is on, but detects that a user is not present by user detection processing (step S422), and performs level output of the signal C as L (step S428).

A time t12 indicates that a person has approached the image processing apparatus 10 again. The microcomputer 514 continues the normal operation power mode because LCDON is on, but, by user detection processing (step S421), detects that a user is present (step S422), and performs level output of the signal C at H (step S423, step S424, and step S426). At the time t11, the CPU 221 of the main controller unit 200 waits for the certain amount of time to pass while a user is not present and there is no job which is a condition for transitioning to the power saving mode, but detects a user by the interrupt of the signal C (t12), and cancels measurement of the certain amount of time.

A time t13 indicates that the user has immediately separated from the image processing apparatus 10. For example, it is envisioned that the user who approached at t12 came to take print material that they printed in the past and soon separated from the image processing apparatus 10. The microcomputer 514, by user detection processing (step S421), detects that a user is not present (step S422), and performs level output of the signal C at L (step S428). The CPU 221 detects that the level of the signal C is L in the normal operation power mode by polling.

Subsequently, when the certain amount of time passes while a user is not present and there is no job, a transition to the power saving mode starts at a time t14, and interrupts are prohibited for the backup processing. The microcomputer 514 identifies that the transition has started because LCDON is turned off, and sets PULSE_F to 1. The microcomputer 514 detects that a user is not present by the waveform of the human detection sensor unit 600, and makes USER_DET remain at 0, and the signal C remain as L.

A time t15 indicates that a person has approached the image processing apparatus 10 again. The microcomputer 514 detects a user from the waveform of the human detection sensor unit 600, similarly to at the time t3, and outputs a pulse on the signal C. At the times t16 and t17, operation that is the same as for the times t7 to t10 are performed.

FIG. 6B illustrates that a return operation is possible even in the case where an interrupt is generated after transitioning during the transition period of FIG. 6A. Because interrupt prohibition is canceled after the transition to the power saving mode, it is possible to detect an edge interrupt in the power supply control unit 211. Note that the same timing number is added to timings at which similar control as in FIG. 6A is performed, and explanation thereof is omitted.

A time t20 indicates that a person has approached the image processing apparatus 10 after the power saving mode is transitioned to. Because LCDON is off and counting for SLPTIM has ended, the microcomputer 514 continues the power saving mode, and, by user detection processing (step S421), detects that a user is present (step S422), and performs a level output for the signal C at H (step S423, step S424, and step S426). By this, the power supply control unit 211 of the main controller unit 200 detects that the edge output of the signal C has changed from L to H at the time t20, and starts an operation to return to the normal operation power mode. At a time t21, power is supplied to the power supply system 2 which includes the CPU 221 of the main controller unit 200, the apparatus state becomes the normal operation power mode, and the CPU 221 sets the LCDON signal to H. Because the times t22 and t23 indicate timing control that is similar to that for the times t20 and t21, explanation thereof is omitted.

As explained above, the image processing apparatus 10 according to the present embodiment is an image processing apparatus that is provided with a main controller unit (a first control unit) 200 for comprehensively controlling the image processing apparatus 10, and a microcomputer for controlling a load (for example the microcomputer 514, a second control unit). The microcomputer 514 notifies the main controller unit 200 of an interrupt signal that is generated in accordance with change of state of the load. During a period in which the image processing apparatus 10 transitions from a first power mode to a second power mode having lower power consumption than the first power mode, the main controller unit 200 prohibits acceptance of an interrupt signal, and cancels the prohibition of interrupts when the transition to the second power mode completes. Meanwhile, when an interrupt signal is generated from a load during the transition period, the microcomputer 514 repeatedly notifies the interrupt signal as a pulse signal to the main controller unit 200, and notifies by changing the pulse signal to a level signal when prohibition of interrupts is cancelled. Accordingly, by virtue of the present application invention, it is possible to identify a transition period, which is an interrupt prohibition period, from an apparatus state, without adding a hardware configuration, such as for issuing a notification signal in the interrupt prohibition period, to a sensor unit that has a sub control unit as with a human detection sensor. When an interrupt is generated during the transition period, it is possible to cause a return by the interrupt after the transition period completes by converting output of the interrupt signal to a pulse.

Second Embodiment

Below, description will be given for a second embodiment of the present invention. In the present embodiment, using an image processing apparatus 20, explanation is given regarding applying prevention of being unable to return due to loss of an edge interrupt to sensors for a front door, a manual insert, opening of the platen, and ADF original detection which have edge interrupts similarly to a human detection sensor. In addition, explanation is also given regarding a configuration in which a reset signal is used for detection of completion of a transition period.

Figure 7:
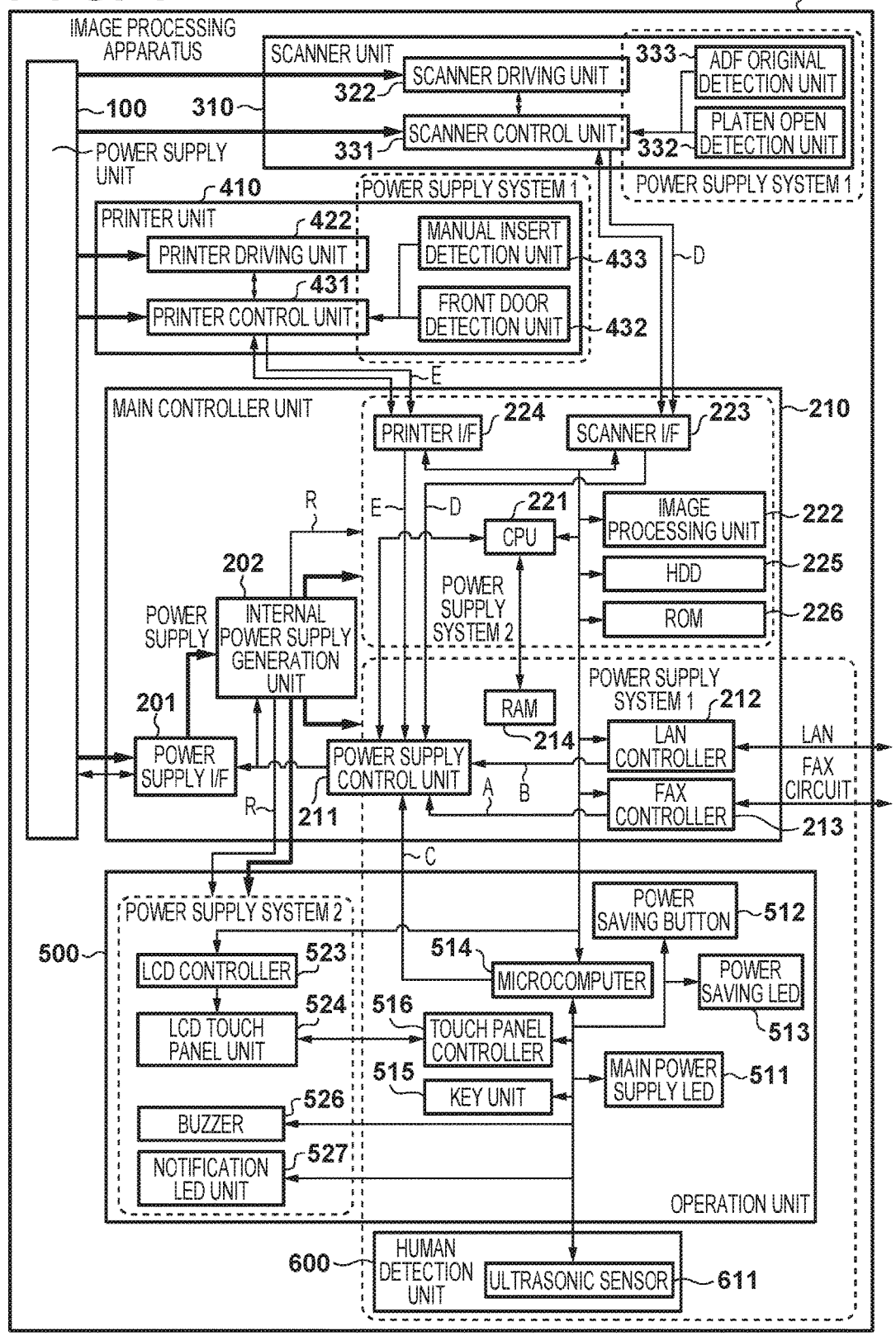
FIG. 7 is a detailed block diagram of an image processing apparatus 20 according to an embodiment.

Firstly, with reference to FIG. 7, explanation is given regarding an example of a configuration of the image processing apparatus 20 according to the present embodiment. The image processing apparatus 20 is something that also applies interrupt signal output control that is configured by the operation unit 500 and the human detection sensor unit 600 of the image processing apparatus 10 to a scanner unit 310 and a printer unit 410. Here, description is mainly given regarding control and configuration that is different to that of the image processing apparatus 10. In other words, the same reference numerals are added to configurations similar to that of FIG. 2, and explanation thereof is omitted.

A main controller unit 210 generates, for each system, a reset signal that is generated together with a power supply by the internal power supply generation unit 202, and supplies it to each power supply system together with the power supply. Although illustration and explanation was unnecessary in the image processing apparatus 10, the main controller unit 200 also similarly generates a reset signal for each system and supplies it together with a power supply.

Furthermore, the main controller unit 210 adds a reset signal to a communication interface between the CPU 221 and sensors. A reset signal R becomes L when the power supply system 2 is off in the power saving mode, and becomes H when the power supply system 2 is on in the normal operation power mode and during the transition period. As illustrated in FIG. 7, the reset signal R of the power supply system 2 is connected to the LCD controller 523, an LCD touch panel 524, the buzzer 526, the notification LED Unit 527, and the microcomputer 514 which are modules of the power supply system 2 of the operation unit 500. Furthermore, the reset signal R is also connected to the scanner I/F 223 and the printer I/F 224 which are modules of the power supply system 2 of the main controller unit 210.

The scanner unit 310 is provided with a scanner control unit 331 and the microcomputer 3311 which is described later, and is provided with an ADF original detection unit 333 and a platen open detection unit 332 that were not illustrated in FIG. 2. In addition, an interrupt signal D is notified as a recovery interrupt from the scanner unit 310 to the power supply control unit 211 of the main controller unit 210. The printer unit 410 is provided with a printer control unit 431 and a microcomputer 4311 which is described later, and is provided with sensors that are not illustrated in FIG. 2: a front door detection unit 432 and a manual insert detection unit 433. In addition, an interrupt signal E is notified as a recovery interrupt from the printer unit 410 to the power supply control unit 211 of the main controller unit 210.

<Configuration of Scanner Unit and Printer Unit>

Figure 8B:
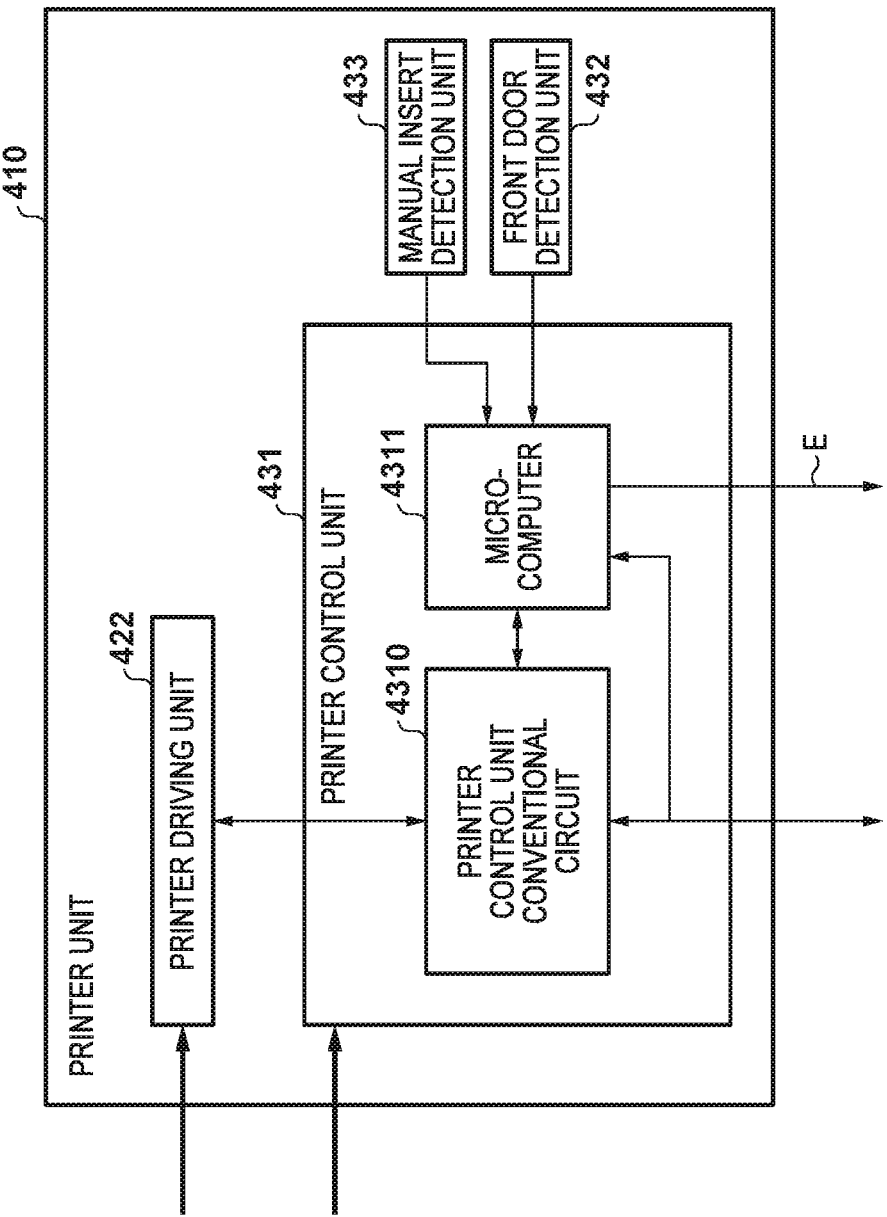
FIG. 8B is a detailed block diagram of a printer unit of the image processing apparatus 20 according to an embodiment.

Next, with reference to FIG. 8A and FIG. 8B, explanation is given regarding detailed configurations of the scanner unit 310 and the printer unit 410. FIG. 8A illustrates a detailed block diagram of the scanner unit 310. The scanner unit 310 has similar functions to the scanner unit 300 of FIG. 2, and, by the microcomputer 3311, executes control for a signal D that is a recovery interrupt.

The scanner driving unit 322 has a similar configuration as that in FIG. 2. The scanner control unit 331 has a configuration in which the scanner control unit 321 of FIG. 2 is set as a conventional circuit 3310 for the scanner control unit, and the microcomputer 3311 is further added. The microcomputer 3311 sets a detection signal inputted from a sensor out of the ADF original detection unit 333 and the platen open detection unit 332 which are not illustrated in FIG. 2 as an interrupt signal D, and notifies it to the power supply control unit 211 via the scanner I/F 223 of the main controller unit 210.

FIG. 8B illustrates a detailed block diagram of the printer unit 410. The printer unit 410 has similar functions to the printer unit 400 of FIG. 2, and, by the microcomputer 4311, executes control for a signal E that is a recovery interrupt. The printer driving unit 422 has a similar configuration to that of FIG. 2. The printer control unit 431 has a configuration in which the printer control unit 421 of FIG. 2 is set as a conventional circuit 4310 for the printer control unit, and the microcomputer 4311 is also added. The microcomputer 4311 sets a detection signal inputted from the sensors that are the front door detection unit 432 and the manual insert detection unit 433 which are not illustrated in FIG. 2 as an interrupt signal E, and notifies it to the power supply control unit 211 via the printer I/F 224 of the main controller unit 210.

<Apparatus State Determination Operation>

Figure 9A:
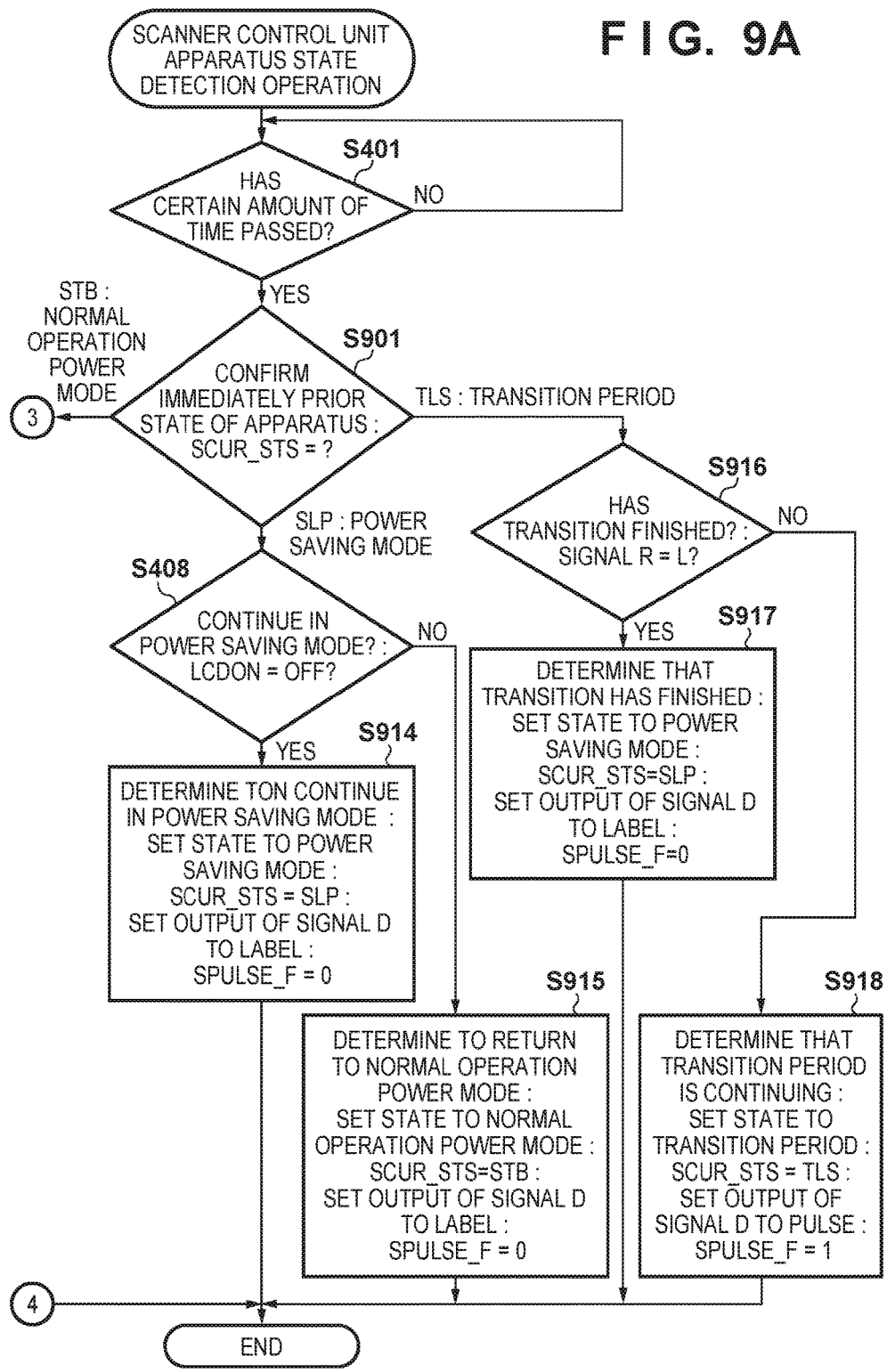
FIGS. 9A and 9B are views that illustrate an apparatus state determination flow of a microcomputer 3311 according to an embodiment.
Figure 9B:
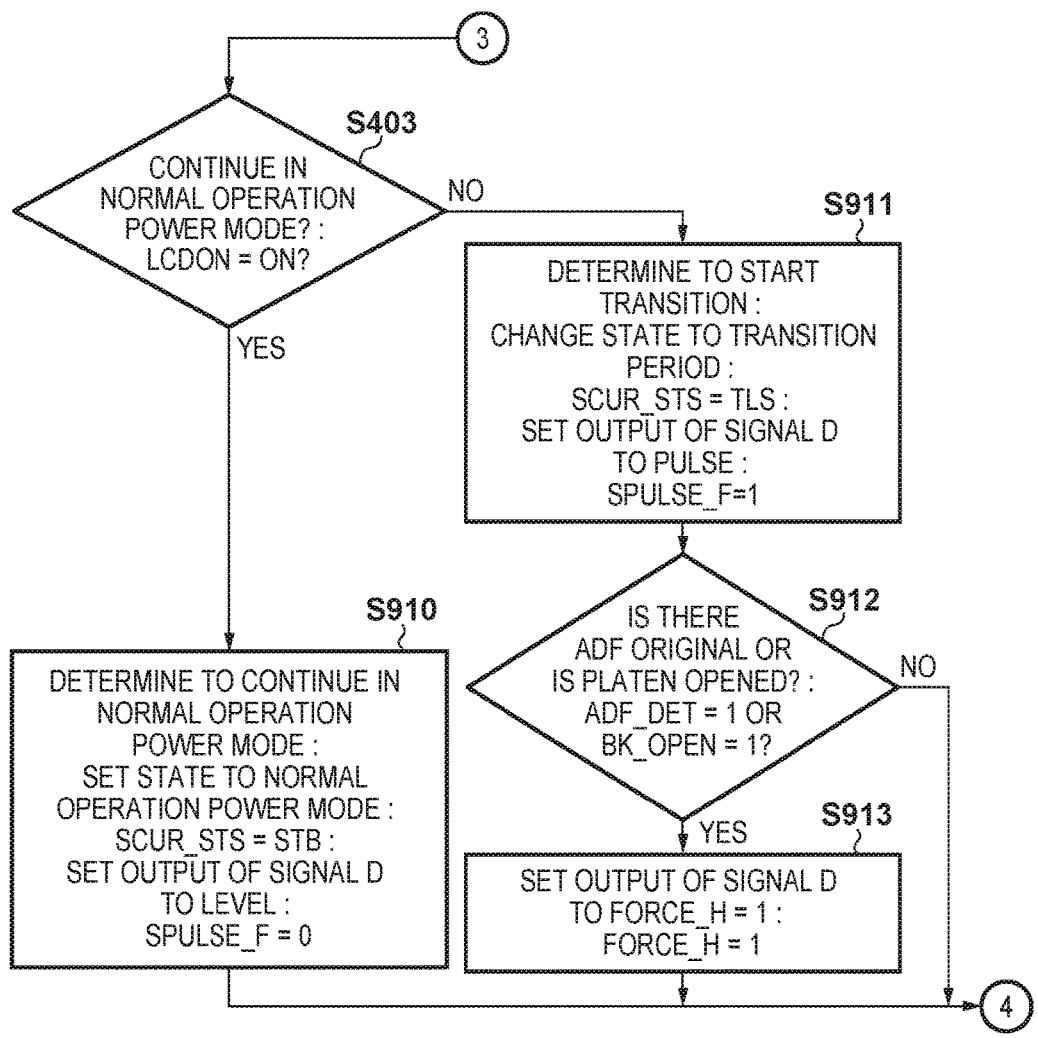

With reference to FIGS. 9A and 9B, explanation is given regarding an operation for preventing being unable to return due to an interrupt being lost when an ADF original detection interrupt is generated in an interrupt prohibition period for backing up, in the image processing apparatus 20 according to the present embodiment. Processing explained below is executed by the microcomputer 3311. A difference with an apparatus state determination operational flow by the microcomputer 514 of the operation unit 500 of FIG. 5 is that the detection timer SLPTIM for detecting completion of a transition to sleeping which is the power saving mode is replaced by a signal R. While there is a need to set timer values for each model of main controller that connects to the timer, by using a reset signal it is possible to detect the completion of a transition without depending on the model. Further differences between FIGS. 9A-9B and FIGS. 4A-4B are that sensors used to produce a recovery interrupt are changed from the human detection sensor unit 600 to the platen open detection unit 332 and the ADF original detection unit 333, the interrupt signal is changed from the signal C to the signal D, and various register names are changed to those for the microcomputer 3311.

In step S401, the microcomputer 3311 determines whether a certain amount of time has passed, and if it passed the processing proceeds to step S901 and the microcomputer 3311 confirms the state of the image processing apparatus 20. In step S901, an operation in which a register for storing and holding the apparatus state becomes SCUR STS for the microcomputer 3311 is the same as in step S402.

If an immediately prior state (an apparatus state determined a previous time) is STB=the normal operation power mode, the processing proceeds to step S403, and the microcomputer 3311 confirms whether LCDON is on as a subsequent confirmation. LCDON is a signal for the operation unit 500, and it is used by connecting the same signal as for the microcomputer 514 to the microcomputer 3311. When another signal present on the scanner I/F indicates the normal operation power mode of the apparatus, that signal may be used. In this way, in the present embodiment, LCDON is also connected to the scanner unit 310 and the printer unit 410. In step S403, the microcomputer 3311 determines to continue if LCDON=on, and determines to start a transition if it is off.

When it is determined to continue the normal operation power mode the processing proceeds to step S910, and the microcomputer 3311 sets SCUR_STS to STB, sets SPULSE F to 0 for making output of the signal D a level output, and this processing terminates.

Meanwhile, when starting a transition is determined the processing proceeds to step S911, and the microcomputer 3311 sets SCUR_STS to TLS, and sets SPULSE_F to 1 for making output of the signal D a pulse output. In step S912, the microcomputer 3311 confirms the sensor output in order to confirm whether it is necessary to hold SFORCE_H=1 which is generated in the case of a designation to transition to the power saving mode by the power saving button 512. Whether there is an ADF original or whether the platen is open is confirmed by ADF_DET and BK_OPEN. If either is detected the processing proceeds to step S913, and the microcomputer 3311 sets SFORCE_H to 1 for the output of the signal D, and this processing ends. Meanwhile, if both are undetected the processing ends as is.

If an immediately prior state is SLP=the power saving mode, the processing proceeds to step S408, and the microcomputer 3311 confirms whether LCDON is off as a subsequent confirmation. If it is off the processing proceeds to step S914, and the microcomputer 3311 determines to continue the power saving mode, sets SCUR_STS to SLP, sets SPULSE_F to 0, and the processing ends. Meanwhile, if LCDON is on in step S408, it is determined to return to the normal operation power mode, the processing proceeds to step S915, and the microcomputer 3311 sets SCUR_STS to STB, sets SPULSE_F to 0, and the processing ends.

If the immediately prior state is TLS=a transition period, the processing proceeds to step S916, and the microcomputer 3311 confirms whether the transition has completed. If the signal R is L it is determined that the transition has completed, the processing proceeds to step S917, and the microcomputer 3311 sets SCUR_STS to SLP, sets SPULSE_F to 0, and the processing ends. Meanwhile, if the signal R is H being in the transition period is determined, the processing proceeds to step S918, and the microcomputer 3311 sets SCUR_STS to TLS, sets SPULSE_F to 1, and the processing ends.

<Signal D Output Operation>

Next, with reference to FIG. 10, explanation is given regarding an output operation of the signal D in the microcomputer 3311. Processing explained below is executed by the microcomputer 3311. Differences with FIG. 5 are that the detection processing of step S421 is not present, and a branch in accordance with a detection result by the human detection sensor unit 600 of step S422 is replaced by branching in accordance with a detection result by the ADF original detection unit 333 or the platen open detection unit 332 of step S920 and step S921. Furthermore, sensors used in the generation of a recovery interrupt are changed from the human detection sensor unit 600 to the platen open detection unit 332 and the ADF original detection unit 333, the interrupt signal is changed from the signal C to the signal D, and various register names are changed to those for the microcomputer 3311.

In step S420, the microcomputer 3311 determines whether a certain amount of time has passed, and, when the certain amount of time has passed, the processing proceeds to step S920, and the microcomputer 3311 confirms whether an original is in the ADF by referring to a detection signal by the ADF original detection unit 333. Furthermore, if an original is not in the ADF the processing proceeds to step S921, and the microcomputer 514 confirms whether the platen is open by referring to a detection signal from the platen open detection unit 332. If there is no original and the platen is closed the processing proceeds to step S926, SFORCE_H=0 is set for the signal D, and in step S927 the output of the signal D is set to L and the processing ends.

If there is an original or if the platen is open the processing proceeds to step S922, and the microcomputer 3311 confirms whether SFORCE_H=1 is set for the output of the signal D, and if it is set the processing proceeds to step S925, the output of the signal D is set to H, and the processing ends. If it is not set the processing proceeds to step S923, the microcomputer 3311 confirms whether pulsing is set, and if pulsing is set the processing proceeds to step S924, a pulse is output on the signal D, and the processing ends. Meanwhile, in the case of level output the processing proceeds to step S925, and the microcomputer 3311 set the output of the signal D to H, and the processing ends.

<Output Operation of Signal C and Signal E>

Next, explanation is given regarding an output operation for the signal C and the signal E, and an apparatus state determination operation of the microcomputer 4311 of the printer unit 410 and the microcomputer 514 of the operation unit 500 of the image processing apparatus 20. The apparatus state determination operation of the microcomputer 514 of the operation unit 500 differs from that in the image processing apparatus 10 and detects completion of a transition period by a signal R that is a reset signal of the power supply system 2, and thus with respect to the flow of FIGS. 4A and 4B, step S405 becomes step S911 of FIG. 9B and step S411 becomes step S918 of FIG. 9A. The output operation of the signal C by the microcomputer 514 is similar to the flow of FIG. 5.

Meanwhile, the apparatus state determination operation of the microcomputer 4311 of the printer unit 410 is an operation of the flow of FIGS. 9A and 9B in which recovery interrupt sensors becomes the front door detection unit 432 and the manual insert detection unit 433, the interrupt signal becomes the signal E, and each register is replaced by that for the microcomputer 4311. The output operation of the signal E is an operation of the flow of FIG. 10 in which the recovery interrupt sensor becomes the front door detection unit 432 and the manual insert detection unit 433, the interrupt signal becomes the signal E, and each register is replaced by those for the microcomputer 4311. The front door detection unit 432 causes an interrupt signal to be generated in accordance with a front door provided on the image processing apparatus 20 being opened. The manual insert detection unit 433 causes an interrupt signal to be generated in accordance with a sheet being placed on the manual feed tray. Other configuration and control is similar to the output operation of the signal D described above or the output operation of the signal C in the first embodiment described above, and thus explanation thereof is omitted.

<Timing Chart>

Next, with reference to FIG. 11A and FIG. 11B, explanation is given regarding operation when returning from the power saving mode with the signal D of the ADF original detection unit 333 or the platen open detection unit 332 as an interrupt, in a state where the human detection sensor unit 600 of the image processing apparatus 20 is turned off. A difference with the return operation of FIG. 6A and FIG. 6B in which with the signal C by the microcomputer 514 and the human detection sensor unit 600 is an interrupt is as follows. Operation is such that the origin of interrupt signal is changed from the human detection sensor unit 600 to the ADF original detection unit 333 and the platen open detection unit 332, SLPTIM for detecting completion of a transition is changed to the signal R, and each register is replaced by that for the microcomputer 3311. Explanation is given below regarding operation differing to that in FIG. 6A and FIG. 6B.

Specifically, at the time t7, the image processing apparatus 20 enters the state of the power saving mode, and the signal R becomes L. Subsequently, at the time t8, the microcomputer 3311 detects the completion of a transition because the signal R has become L (step S916), sets SCUR_STS to SLP, and sets SPULSE_F to 0 to make the signal D have a level output (step S917). Because there is an ADF original, FORCE_H=1 is not set, and a level output setting has been made (step S920, step S922, and step S923), the microcomputer 3311 outputs the signal D as H (step S925). The power supply control unit 211 of the main controller unit 210 detects a rising edge of the signal D, and returns to the normal operation power mode at the time t10.

As explained above, in the present embodiment, it is possible to apply the present invention to an edge interrupt from a respective sensor for ADF original detection, opening of a platen, a manual insert, and a front door. Accordingly, it is possible to have these edge interrupts be a trigger for a return to the normal operation power mode without return being impossible due to the loss of an edge interrupt generated in an interrupt prohibition period that a period for transitioning to the power saving mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198328 filed on Oct. 6, 2016, which is hereby incorporated by reference herein in its entirety.

What is claimed is:

1. An image processing apparatus comprising:
    a first control unit that comprehensively controls the image processing apparatus; and
    a second control unit that controls a load, and notifies an interrupt signal generated in accordance with a change of state of the load to the first control unit,
    wherein the first control unit
    prohibits acceptance of the interrupt signal in a transition period where the image processing apparatus transitions from a first power mode to a second power mode having lower power consumption than the first power mode, and cancels the prohibition of interrupts when the transition to the second power mode completes, and
    the second control unit
    when the interrupt signal is generated during the transition period, repeatedly notifies the first control unit the interrupt signal as a pulse signal, and when prohibition of interrupts is cancelled by the first control unit, notifies the first control unit by changing the pulse signal to a level signal.

2. The image processing apparatus according to claim 1, wherein
    the second control unit
    periodically determines an apparatus state of whether the image processing apparatus is in the first power mode, in the transition period, or in the second power mode.

3. The image processing apparatus according to claim 2, wherein
    the second control unit
    comprises a count unit that counts a predetermined period for transitioning from the first power mode to the second power mode, and
    determines the apparatus state based on an apparatus state determined previously, whether a backlight of a display unit provided in the image processing apparatus is turned on or turned off, and the counting by the count unit.

4. The image processing apparatus according to claim 2, wherein
    the first control unit
    comprises a power supply control unit that supplies power in accordance with the first power mode and the second power mode, and notifies a reset signal to each unit when a transition from the first power mode to the second power mode completes, and
    the second control unit determines the apparatus state based on an apparatus state determined previously, whether a backlight of a display unit provided in the image processing apparatus is turned on or turned off, and the reset signal in accordance with the power supply control unit.

5. The image processing apparatus according to claim 1, wherein
    the second control unit
    notifies the first control unit the interrupt signal as a level signal when the interrupt signal is generated in the first power mode and the second power mode.

6. The image processing apparatus according to claim 1, wherein the load is a detection unit that generates the interrupt signal after detecting a person who has approached the image processing apparatus.

7. The image processing apparatus according to claim 1, wherein the load is a detection unit that generates the interrupt signal when detecting that a platen provided in the image processing apparatus has been opened.

8. The image processing apparatus according to claim 1, wherein the load is a detection unit that generates the interrupt signal when detecting that an original has been placed in an auto document feed unit provided in the image processing apparatus.

9. The image processing apparatus according to claim 1, wherein the load is a detection unit that generates the interrupt signal when detecting that a front door provided in the image processing apparatus has been opened.

10. The image processing apparatus according to claim 1, wherein the load is a detection unit that generates the interrupt signal when detecting that a sheet has been placed in a manual feed tray provided in the image processing apparatus.

11. A method for controlling an image processing apparatus provided with a first control unit that comprehensively controls the image processing apparatus, and a second control unit that controls a load and notifies an interrupt signal generated in accordance with a change of state of the load to the first control unit, the method comprising:
in the first control unit,
prohibiting acceptance of the interrupt signal in a transition period where the image processing apparatus transitions from a first power mode to a second power mode having lower power consumption than the first power mode, and canceling the prohibition of interrupts when the transition to the second power mode completes, and
in the second control unit,
when the interrupt signal is generated during the transition period, repeatedly notifying the first control unit the interrupt signal as a pulse signal, and when prohibition of interrupts is cancelled by the first control unit, notifying the first control unit by changing the pulse signal to a level signal.

12. A non-transitory computer-readable storage medium storing a computer program for causing a computer to execute each step of a method for controlling an image processing apparatus provided with a first control unit that comprehensively controls the image processing apparatus, and a second control unit that controls a load and notifies an interrupt signal generated in accordance with a change of state of the load to the first control unit, the method comprising:
in the first control unit,
prohibiting acceptance of the interrupt signal in a transition period where the image processing apparatus transitions from a first power mode to a second power mode having lower power consumption than the first power mode, and canceling the prohibition of interrupts when the transition to the second power mode completes, and
in the second control unit,
when the interrupt signal is generated during the transition period, repeatedly notifies the first control unit the interrupt signal as a pulse signal, and when prohibition of interrupts is cancelled by the first control unit, notifies the first control unit by changing the pulse signal to a level signal.

* * * * *